(12) United States Patent
Saitoh et al.

(10) Patent No.: US 7,755,730 B2
(45) Date of Patent: *Jul. 13, 2010

(54) OPTICAL COMPENSATION FILM AND LIQUID CRYSTAL DISPLAY HAVING THE SAME

(75) Inventors: Yukito Saitoh, Minami-ashigara (JP); Junichi Hirakata, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 1342 days.

This patent is subject to a terminal disclaimer.

(21) Appl. No.: 11/053,442

(22) Filed: Feb. 9, 2005

(65) Prior Publication Data

US 2005/0195348 A1 Sep. 8, 2005

(30) Foreign Application Priority Data

Feb. 9, 2004 (JP) .............................. 2004-032105

(51) Int. Cl.
*G02F 1/13363* (2006.01)

(52) U.S. Cl. ...................................... 349/118; 349/117

(58) Field of Classification Search ................. 349/117, 349/118
See application file for complete search history.

(56) References Cited

U.S. PATENT DOCUMENTS

| | | | | |
|---|---|---|---|---|
| 6,476,892 B2 * | 11/2002 | Aminaka | .................... | 349/117 |
| 6,753,939 B2 * | 6/2004 | Jisaki et al. | .................. | 349/114 |
| 6,937,310 B2 * | 8/2005 | Elman et al. | ................. | 349/118 |
| 2002/0135725 A1 * | 9/2002 | Terashita et al. | ............ | 349/129 |
| 2003/0138654 A1 * | 7/2003 | Kido et al. | .................. | 428/521 |

FOREIGN PATENT DOCUMENTS

| | | |
|---|---|---|
| JP | 11-95208 | 4/1999 |
| JP | 2001 100027 A | 4/2001 |
| JP | 2001 114914 A | 4/2001 |
| JP | 2001 116926 A | 4/2001 |
| JP | 2001 129927 A | 5/2001 |
| JP | 2001 188128 A | 7/2001 |
| JP | 2001 225337 A | 8/2001 |
| JP | 2002 082225 A | 3/2002 |
| JP | 2002 131536 A | 5/2002 |
| JP | 2002-221622 | 8/2002 |
| JP | 2003-15134 | 1/2003 |
| JP | 2003 270442 A | 9/2003 |
| JP | 2003 279729 A | 10/2003 |
| JP | 2003 302503 A | 10/2003 |
| WO | WO 01/81957 A1 | 11/2001 |

* cited by examiner

*Primary Examiner*—Andrew Schechter
(74) *Attorney, Agent, or Firm*—Buchanan Ingersoll & Rooney PC

(57) ABSTRACT

A novel optical compensation film is disclosed. The optical compensation film has Re/Rth(450 nm), a ratio of Re to Rth measured at 450 nm, 0.4 to 0.95 times as large as Re/Rth(550 nm) at 550 nm, and having Re/Rth(650 nm) at 650 nm 1.05 to 1.9 times as large as Re/Rth(550 nm) at 550 nm. In the formulae, Re is in-plane retardation defined as $Re=\{(nx-ny) \times d_1\}$; Rth is depth retardation defined as $Rth=[\{(nx+ny)/2-nz\} \times d_1]$; $d_1$(nm) is a thickness of the film, nx, ny and nz are respectively mean refractive indices in the directions of x-axis, y-axis and z-axis orthogonal to each other; nx and ny are in-plane main mean refractive indices in parallel with the surface of said optical compensation film (where, ny<nx); and nz is a depth main mean refractive index.

24 Claims, 7 Drawing Sheets

RELATED ART

RELATED ART

RELATED ART

OPTICAL COMPENSATION FILM AND LIQUID CRYSTAL DISPLAY HAVING THE SAME

CROSS-REFERENCE TO RELATED APPLICATIONS

This application claims benefit of priority under 35 USC 119 to Japanese Patent Application No. 2004-032105 filed Feb. 9, 2004.

TECHNICAL FIELD

The present invention relates to optical compensation films and liquid crystal displays employing them.

RELATED ART

A liquid-crystal display usually comprises a liquid-crystal cell and a polarizing plate. A polarizing plate usually has a protective film and a polarizing film, and is typically obtained by staining a polarizing film made of a polyvinyl alcohol film with iodine, stretching the film, and stacking protective films on both surfaces of the film. In some configuration of transmission-type liquid crystal displays, the polarizing plate may be attached on both sides of the liquid crystal cell, and some cases also adopt one or more optical compensation sheet placed thereon. In reflection-type liquid crystal displays, a reflective plate, a liquid crystal cell, one or more optical compensation sheet(s) and the polarizing plate are disposed in this order. The liquid crystal cell comprises liquid-crystalline molecules, two substrates for encapsulating the liquid-crystalline molecules in between, and electrode layer for applying voltage to the liquid-crystalline molecules. The liquid crystal cell performs ON/OFF display based on difference in the orientation state of the liquid-crystalline molecules, and is applicable both to transmission type and reflection type. Proposed examples of the display modes include TN (twisted nematic), IPS (in-plane switching), OCB (optically compensatory bend), VA (vertically aligned) and ECB (electrically controlled birefringence).

Among these LCDs, for obtaining high display properties, 90 degree twisted nematic type liquid-crystal displays, or in other words TN-mode liquid-crystal display, employing nematic liquid-crystal molecules having a positive dielectric anisotropy and being driven by thin film transistor, are mainly used. Although, observed in the normal direction, TN-mode LCD's can give images having excellent qualities, observed in the oblique direction, they give inferior images with low contrast and grayscale inversion which is a phenomenon of reversing brightness in grayscale. Such viewing angle properties are required to improve.

As a recent LCD system improved in the viewing angle characteristics, there has been proposed a vertically-aligned nematic liquid crystal display (referred to as "VA mode", hereinafter), using a nematic liquid crystal molecule having a negative dielectric anisotropy, in which the liquid crystal molecules, aligned so as to orient the long axes thereof nearly normal to the substrates under absence of applied voltage, are driven by thin film transistors (see Japanese Laid-Open Patent Publication "Tokkaihei" No. 2-176625). The VA mode DLC comprising a viewing-angle-compensating retardation film is not only excellent in the display characteristics of the front view, similarly to the TN mode, but also in the viewing angle characteristics. In the VA mode, it is also known that more wider viewing angle characteristics can be obtained by using two negative uniaxial retardation films each having an optical axis in the direction normal to the film surface respectively on the upper and lower sides of a liquid crystal cell, and by further providing the LCD with uniaxially-aligning retardation films each having a positive refractive index anisotropy and an in-plane retardation of 50 nm (see SID 97 DIGEST, p. 845-848).

Use of two retardation films (see SID 97 DIGEST, p. 845-848), however, not only raises the production cost, but also degrades the yield ratio due to stacking of a number of films, increases the thickness due to use of a number of films, and thereby makes the display device disadvantageous in the thinning. It is also anticipated that use of an adhesive layer for stacking stretched films may result in separation or warping of the films due to shrinkage of the adhesive layer under varied temperature or humidity. Known methods for solving these problems include a method capable of reducing the number of use of retardation films (see Japanese Laid-Open Patent Publication "Tokkaihei" No. 11-95208), and a method using a cholesteric liquid crystal layer (see Japanese Laid-Open Patent Publications "Tokkai" No. 2003-15134 and "Tokkaihei" No. 11-95208). Even these methods, however, need bonding of a plurality of films, and are therefore still unsatisfactory in view of thinning and reduction in the production costs. Another problem resides in that leakage of light in the oblique direction from the polarizing plate in the black state cannot completely be suppressed, and therefore the viewing angle cannot fully be widened. A more important matter is that it is difficult to completely compensate the light leakage of the incident light oblique to the polarizing plate in the black state over the entire wavelength range of the visible light, and this causes azimuth directional dependence in the color shifting. A proposal has been made also on a method of preventing the light leakage by controlling wavelength dispersion in the retardation of the film (see Japanese Laid-Open Patent Publication "Tokkaihei" No. 2002-221622), but the method has made no consideration on difference between the wavelength dispersions in the in-plane retardation and in depth retardation, and has given only a limited effect of suppressing the light leakage.

SUMMARY OF THE INVENTION

It is therefore an object of the present invention to optically compensate a liquid-crystal cell, especially a VA-mode liquid-crystal cell in an exact manner, and to provide a liquid crystal display, especially a VA-mode liquid crystal display, with a high contrast, which is reduced in the viewing-angle-dependent coloring in the black state. It is another object of the present invention to provide an optical compensation film capable of optically compensating a liquid crystal cell, in particular a VA-mode liquid crystal cell, and of contributing to improvement in the contrast and reduction in the viewing-angle-dependent coloring.

From one aspect, the present invention provides an optical compensation film having thickness $d_1$(nm), and mean refractive indices nx, ny and nz respectively in the directions of x-axis, y-axis and z-axis orthogonal to each other, nx and ny being in-plane main mean refractive indices in parallel with the surface of said optical compensation film (where, ny<nx), nz being a depth main mean refractive index, and having Re/Rth(450 nm), a ratio of Re to Rth measured at 450 nm, 0.4 to 0.95 times as large as Re/Rth(550 nm) at 550 nm, and having Re/Rth(650 nm) at 650 nm 1.05 to 1.9 times as large as Re/Rth(550 nm) at 550 nm, Re being in-plane retardation defined as Re={(nx−ny)×$d_1$}, and Rth being depth retardation defined as Rth=[{(nx+ny)/2−nz}×$d_1$].

As embodiments of the present invention, the optical compensation film having Rth at 550 nm falling within the range from 70 nm to 400 nm; the optical compensation film of which Re/Rth(450 nm) is 0.6 to 0.8 times as large as Re/Rth (550 nm) at 550 nm; the optical compensation film of which Re/Rth(650 nm) is 1.2 to 1.7 times as large as Re/Rth(550 nm); the optical compensation film of claim 1, of which Re/Rth(450 nm), Re/Rth(550 nm) and Re/Rth(650 nm) respectively fall within the range from 0.1 to 0.8; the optical compensation film formed of a composition comprising at least one cellulose acylate; the optical compensation film wherein the composition comprising at least one rod-like compound having at least two aromatic rings; and the optical compensation film wherein the rod-like compound represented by a formula (1):

$$Ar^1-L^1-Ar^2 \quad \text{Formula (1)}$$

where $Ar^1$ and $Ar^2$ independently represents a substituted or non-substituted aromatic group, and $L^1$ represents a divalent linking group selected from alkylene group, alkenylene group, alkynylene group, —O—, —CO— and any combinations thereof; are provided.

From another aspect, the present invention provides a liquid crystal display comprising:
a liquid crystal cell comprising:
 a pair of substrates having an electrode formed on at least either one of said pair, disposed facing each other; and
 a liquid crystal layer held between said pair of substrates, comprising a nematic liquid crystal material, liquid crystal molecules of said nematic liquid crystal material being aligned substantially normal to the surfaces of said pair of substrates in the black state, and having a Δn·d of 0.2 to 1.0 μm, said Δn·d being a product of the thickness d (μm) and the refractive index anisotropy Δn;
first and second polarizing films disposed so as to hold said liquid crystal cell in between; and
an optical compensation film disposed between at least one of said first and second polarizing films and said liquid crystal cell,
wherein said optical compensation film has thickness $d_1$(nm), and mean refractive indices nx, ny and nz respectively in the directions of x-axis, y-axis and z-axis orthogonal to each other, nx and ny being in-plane main mean refractive indices in parallel with the surface of said optical compensation film (where, ny<nx), nz being a depth main mean refractive index, has Re/Rth(450 nm), a ratio of Re to Rth measured at 450 nm, 0.4 to 0.95 times as large as Re/Rth(550 nm) at 550 nm, and has Re/Rth(650 nm) at 650 nm 1.05 to 1.9 times as large as Re/Rth(550 nm) at 550 nm, Re being in-plane retardation defined as Re={(nx−ny)×$d_1$}, and Rth being depth retardation defined as Rth=[{(nx+ny)/2−nz}×$d_1$], and Rth at 550 nm of said optical compensation film is 70 nm to 400 nm.

As embodiments of the present invention, the liquid crystal display comprising said optical compensation film between said liquid crystal cell and each of said first and second polarizing films; and the liquid crystal display wherein the in-plane slow axis of said optical compensation film, and the transmission axis of either one of said first and second polarizing film disposed closer to said optical compensation film are substantially in parallel with each other; are provided.

According to the present invention, it is possible to provide an optical compensation film capable of optically compensating the liquid crystal cell, in particular the VA-mode liquid crystal cell, in the black state almost over the entire visible light wavelength ranges. As a consequence, the liquid crystal display of the present invention is successfully reduced in the light leakage in the oblique direction in the black state, and is distinctively improved in the viewing angle contrast. The liquid crystal display of the present invention is successful in lowering the light leakage in the oblique direction in the black state almost over the entire visible light region, and is consequently improved remarkably in the viewing-angle-dependent color shifting in the black state, which has been a conventional problem.

In the figures, the numerical numbers mean as follows:
1 polarizing film,
2 absorption axis,
3a protective film,
4a in-plane slow axis,
5 optical compensation film,
5a in-plane slow axis,
6 substrate,
7 liquid-crystalline molecule
8 substrate,
9 optical compensation film,
9a in-plane slow axis,
103a protective film,
104a in-plane slow axis, and
102 polarizing film.

DETAILED DESCRIPTION OF THE INVENTION

Hereafter, the present invention will be explained in detail. In the specification, ranges indicated with "to" mean ranges including the numerical values before and after "to" as the minimum and maximum values.

It is to be noted that "45°", "parallel" and "orthogonal" in the context of this specification allow a tolerance of less than ±5° with respect to the precise angles. Difference from the precise angles is preferably less than 4°, and more preferably less than 3°. With respect to the angles, "+" corresponds to the clockwise direction, and "−" corresponds to the counterclockwise direction. The "slow axis" means the direction in which the refractive index becomes maximum. The "visible light region" means a wavelength range from 380 nm to 780 nm. The measurement wavelength for the refractive index is λ=550 nm in the visible light region, unless otherwise specifically noted.

In the specification, the terms of "polarizing plate" means not only polarizing plates having a proper size to be employed in a liquid-crystal but also long polarizing plates before being cut. And in the specification, the terms of "polarizing film" is distinct from the term "polarizing plate", and the term of "polarizing plate" is used for any laminated body comprising a "polarizing film" and at least one protective film thereon.

Figure 1:
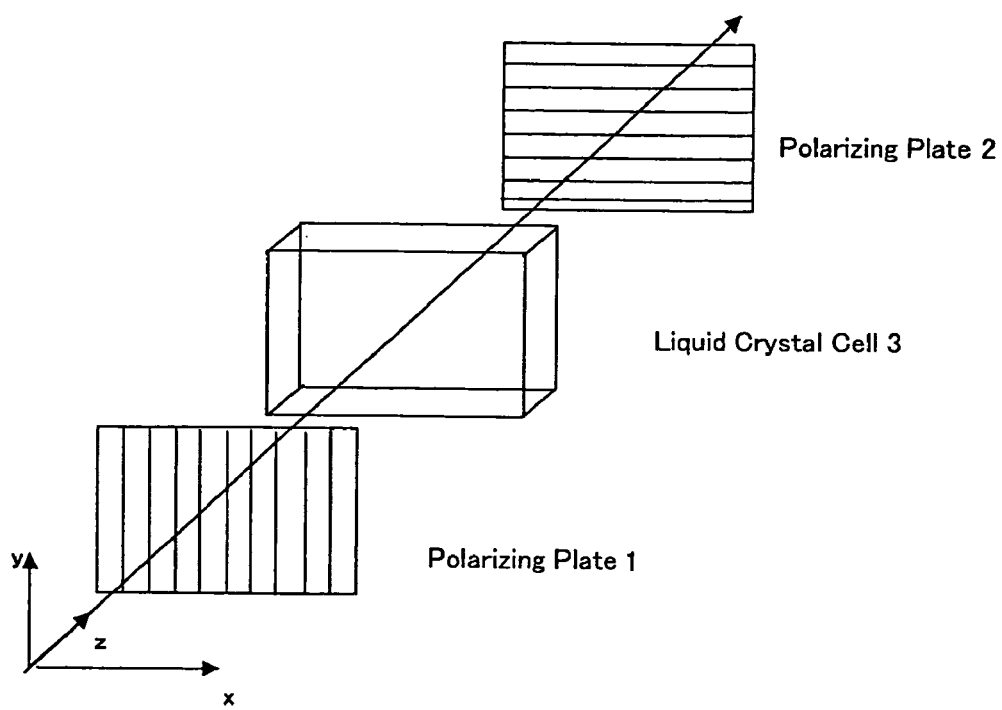
FIG. 1 is a schematic drawing of an exemplary configuration of a conventional VA-mode liquid crystal display.

The following paragraphs will describe operations of the present invention referring to the attached drawings. FIG. 1 is a schematic drawing showing a configuration of a general VA-mode liquid crystal display. The VA-mode liquid crystal display comprises a liquid crystal cell 3 having a liquid crystal layer in which liquid crystal molecules are vertically aligned with respect to the surface of the substrates under absence of applied voltage, or in the black state, and a polarizing plate 1 and a polarizing plate 2 holding the liquid crystal cell 3 in between, arranged so that the direction of the individual transmission axes (indicated by hatching in FIG. 1) cross normal to each other. In FIG. 1, the light comes from the polarizing plate 1 side. When the light propagating in the direction of the normal line, or the z-axis, is incident on the device under absence of applied voltage, the light transmitted through the polarizing plate 1 passes through the liquid crystal cell 3 while keeping the linear polarized state thereof, and completely intercepted by the polarizing plate 2. This is successful in giving a high contrast image display.

Figure 2:
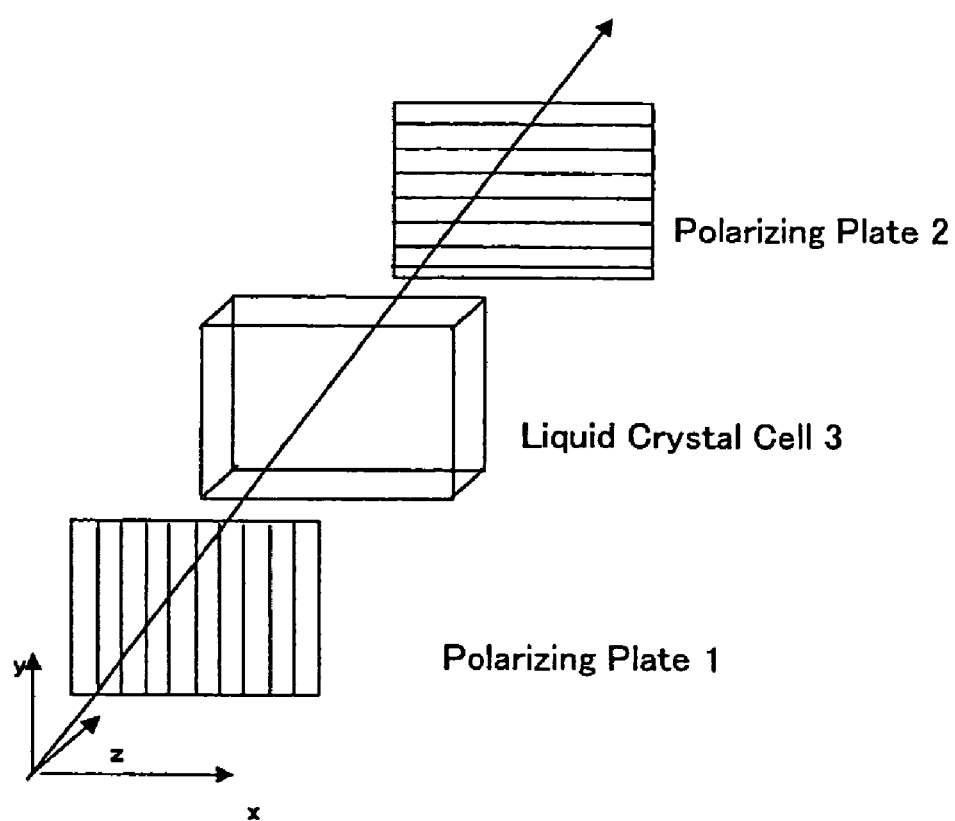
FIG. 2 is a schematic drawing of an exemplary configuration of a conventional VA-mode liquid crystal display.

The situation is, however, not the same for the case of oblique incidence of light as shown in FIG. 2. When the light comes from an oblique direction deviated from the z-axis, that is, from an direction oblique to the directions of polarization of the polarizing plates 1 and 2 (so-called, off axis), the incident light passing through the vertically-aligned liquid crystal layer of the liquid crystal cell 3 causes a change in the polarization state thereof, affected by retardation in the oblique direction. In addition, apparent transmission axes of the polarizing plate 1 and the polarizing plate 2 are shifted from the orthogonal arrangement. Due to two these factors, the off-axis incident light from the oblique direction cannot completely be intercepted by the polarizing plate 2, and results in lowered contrast in the black state due to the light leakage.

Polar angle and azimuth will now be defined. The polar angle is an angle of inclination from the direction of the normal line on the film surface, that is, from the z-axis in FIG. 1 and FIG. 2. For example, the direction of the normal line on the film surface can be expressed with polar angle=0°. The azimuth expresses a direction rotated counter-clockwisely on the basis of the positive direction of the x-axis, wherein, for example, the positive direction of the x-axis can be expressed with azimuth=0°, and the positive direction of the y-axis can be expressed with azimuth=90°. The above-described oblique direction, or off-axis, refers to the cases where the polar angle is not 0°, and in particular refers to the cases with azimuth=45°, 135°, 225° and 315°.

Figure 3:
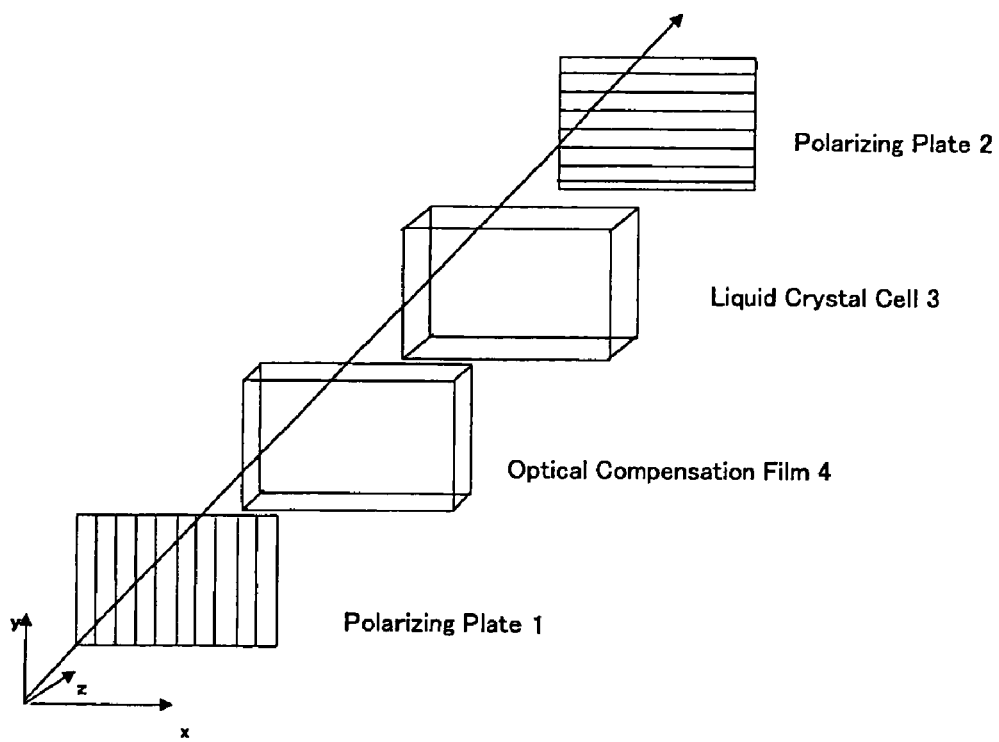
FIG. 3 is a schematic drawing of an exemplary configuration of a VA-mode liquid crystal display of the present invention.

FIG. 3 shows a schematic drawing of an exemplary configuration for explaining operations of the present invention. The configuration shown in FIG. 3 is a modification of the configuration shown in FIG. 1, further comprising an optical compensation film 4 disposed between the liquid crystal cell 3 and the polarizing plate 1. The optical compensation film 4 has optical characteristics such that Re/Rth(450 nm), a ratio of Re to Rth measured at 450 nm, is 0.4 to 0.95 times as large as Re/Rth(550 nm) at 550 nm, and that Re/Rth(650 nm) at 650 nm is 1.05 to 1.9 times as large as Re/Rth(550 nm) at 550 nm. By using the optical compensation film having this sort of optical characteristics, the present invention makes it possible to optically compensate for obliquely incident R, G and Blights, with the slow axes and retardation values different for each of the wavelengths. This is consequently successful in distinctively improving the viewing angle contrast in the black state as compared with that in the conventional liquid crystal display, and in distinctively reducing the viewing-angle-dependent coloring in the black state. It is to be noted that the wavelengths of R, G and B adopted in the present invention are 650 nm, 550 nm and 450 nm, respectively. The R, G and B wavelengths are not always represented by these wavelengths, but are considered as appropriate for specifying the optical characteristics capable of expressing the effects of the present invention.

Figure 4:
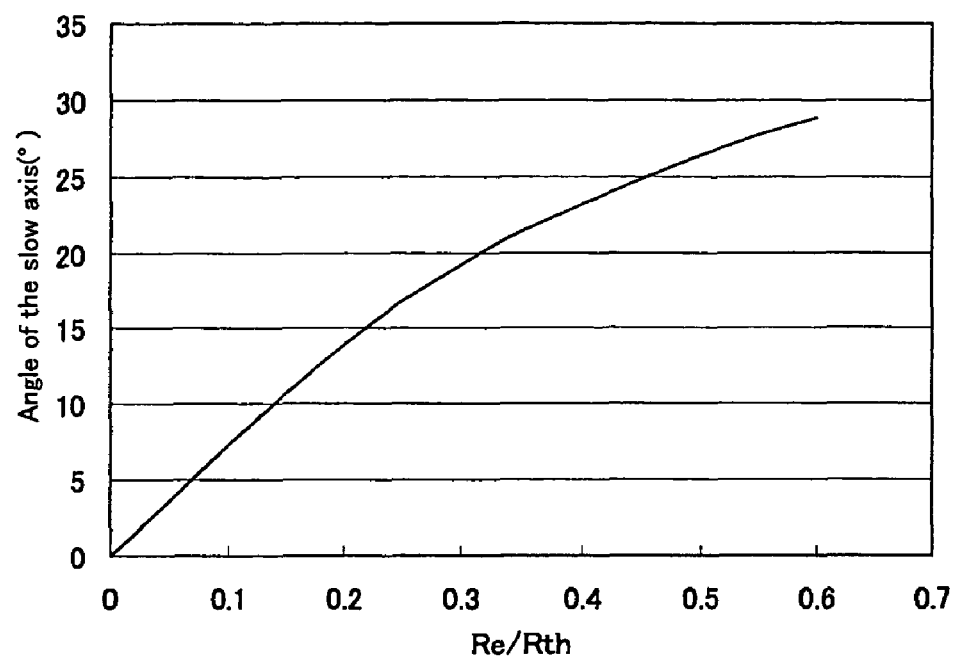
FIG. 4 is a graph showing optical characteristics of an exemplary optical compensation film used for the present invention.

One feature of he present invention resides in that the Re/Rth value, or in other words the ratio of Re and Rth, is used. This is because a Re/Rth value determines two intrinsic polarization axes in an oblique propagation of light in a biaxial birefringent medium. FIG. 4 shows an exemplary calculated result of a relation between a direction of one of two intrinsic polarization axes and Re/Rth, for the case where the light comes obliquely into the optical compensation film used in the present invention. The direction of propagation of the light herein was assumed as having azimuth=45° and polar angle=34°. It is found from FIG. 4 that determination of Re/Rth automatically gives one axis of the intrinsic polarization. How the polarization state of the incident light will change during the passage through the optical compensation film is determined principally by the azimuth of the in-plane slow axis of the optical compensation film, and the retardation of the optical compensation film. The present invention optimizes both of the azimuth of the in-plane slow axis and retardation, which are main factors determining changes in the polarization state, for each wavelength of R, G and B, by specifying the relation of Re/Rth for each wavelength of R, G and B. This consequently enables a complete optical compensation by a single optical compensation film, even if there are two factors, one of which the oblique incident light is affected by the retardation in the oblique direction of the liquid crystal layer, and other of which apparent transmission axes of polarizing plate 1 and polarizing plate 2 are shifted from the orthogonal arrangement, to thereby successfully reduce lowering in the contrast. It can therefore be said that an almost complete optical compensation over the entire visible light region can be obtained by determining the parameters of the film through representing the entire visible light region with R, G and B.

The liquid crystal molecules in the VA-mode display are vertically aligned under the absence of applied voltage, or in the black state. And, thus, it is preferable that the in-plane slow axis of the optical compensation film 4 is normal to or parallel to the transmission axis of the polarizing plate 1 or polarizing plate 2, so as to prevent the polarization state of the light incident from the direction of the normal line from being affected by the retardation of the optical compensation film 4 in the black state. It is allowable to dispose another optical compensation film also disposed between the polarizing plate 2 and liquid crystal cell 3. Also in this case, it is preferable that the in-plane slow axis of the optical compensation film is normal to or parallel to the transmission axis of the polarizing plate 1 or polarizing plate 2.

Figure 5:
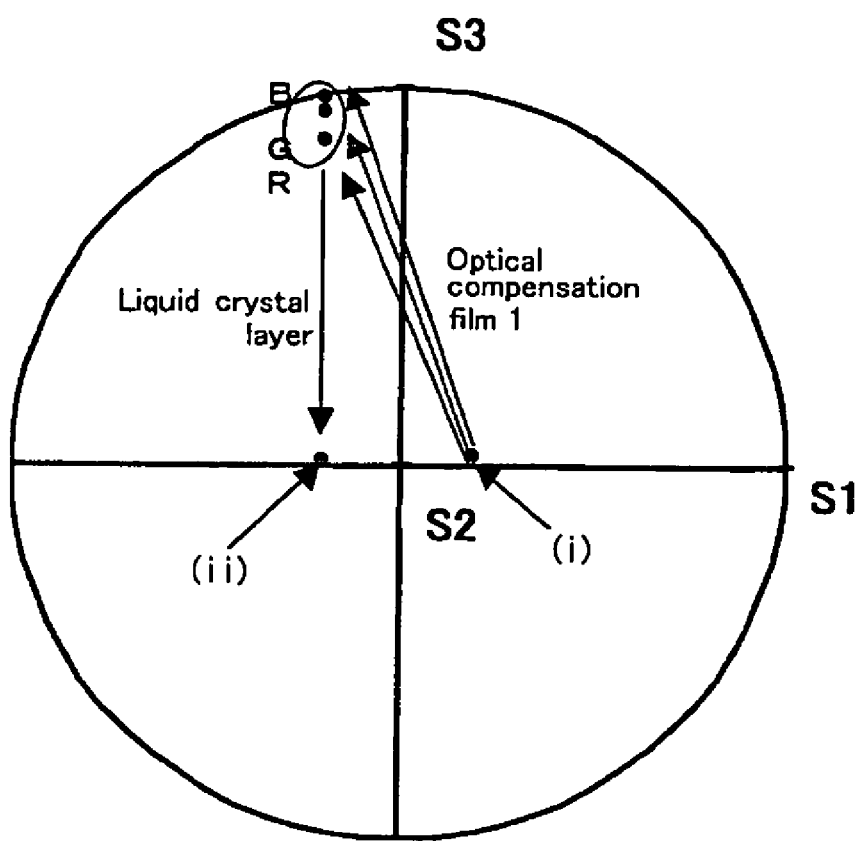
FIG. 5 is a schematic drawing of the Poincare sphere used for explaining a change in the polarization state of the incident light on the liquid crystal display of the present invention.

FIG. 5 is a drawing explaining the compensation mechanism of the configuration shown in FIG. 3, based on the Poincare sphere. The direction of propagation of light herein is assumed as having azimuth=45° and polar angle=34°. In FIG. 5, axis S2 normally penetrates the sheet from this side to the back behind, and FIG. 5 is a view from the positive direction of axis S2. Although FIG. 5 in a two-dimensional expression indicates displacement of points before and after a change in the polarization status using a straight arrow in the drawing, any actual change in the polarization state of the light caused by passage through the liquid crystal layer or optical compensation film can be expressed on the Poincare sphere by rotation by a specific angle around a specific axis determined corresponding to the individual optical characteristics.

Polarization state of the incident light transmitted through the polarizing plate 1 shown in FIG. 3 corresponds to a point (i) in FIG. 5, and polarization state of the light intercepted by the absorption axis of the polarizing plate 2 shown in FIG. 3 corresponds to a point (ii) in FIG. 5. In the conventional VA-mode liquid crystal display, leakage of off-axis light in the oblique direction is ascribable to the displacement between the point (i) and point (ii). The optical compensation film is generally used for shifting the polarization state of the incident light from the point (i) to point (ii), including a change in the polarization state of the liquid crystal layer. Since the liquid crystal layer of the liquid crystal cell 3 shows a positive refractive index anisotropy, and has the vertical alignment, a change in the polarization state of the incident light caused by passage through the liquid crystal layer is expressed by a downward arrow in FIG. 5, in a form of rotation around the axis S1. In order to completely intercept the visible light transmitted through the liquid crystal layer by the polarization plate, the start point before the rotation must fall on the line obtained by rotating the point (ii) around the axis S1, with respect to each of R, G and B lights. Since the angle of rotation is in proportion to $\Delta n'd'/\lambda$, which is a value derived from an effective retardation $\Delta n'd'$ in the oblique direction through the liquid crystal layer divided by wavelength, the angles of rotation for R, G and B, which differ in the wavelength, do not agree. In order to allow all polarization states for R, G and B lights after the rotation to fall on the point (ii), it is therefore necessary, as shown in FIG. 5, that the individual polarization states for R, G and B lights before the rotation fall on the line obtained by rotating the point (ii) around the axis S1, and are located on the points corresponded to the individual angles of rotation. In order to establish the above-described polarization states individually for R, G and B after passing through the optical compensation film 4 but before passing through the liquid crystal cell 3, the present invention disposes the optical compensation film having Re/Rth values for R, G and B individually satisfying the specific relations, to thereby effect the optical compensation.

Figure 6:
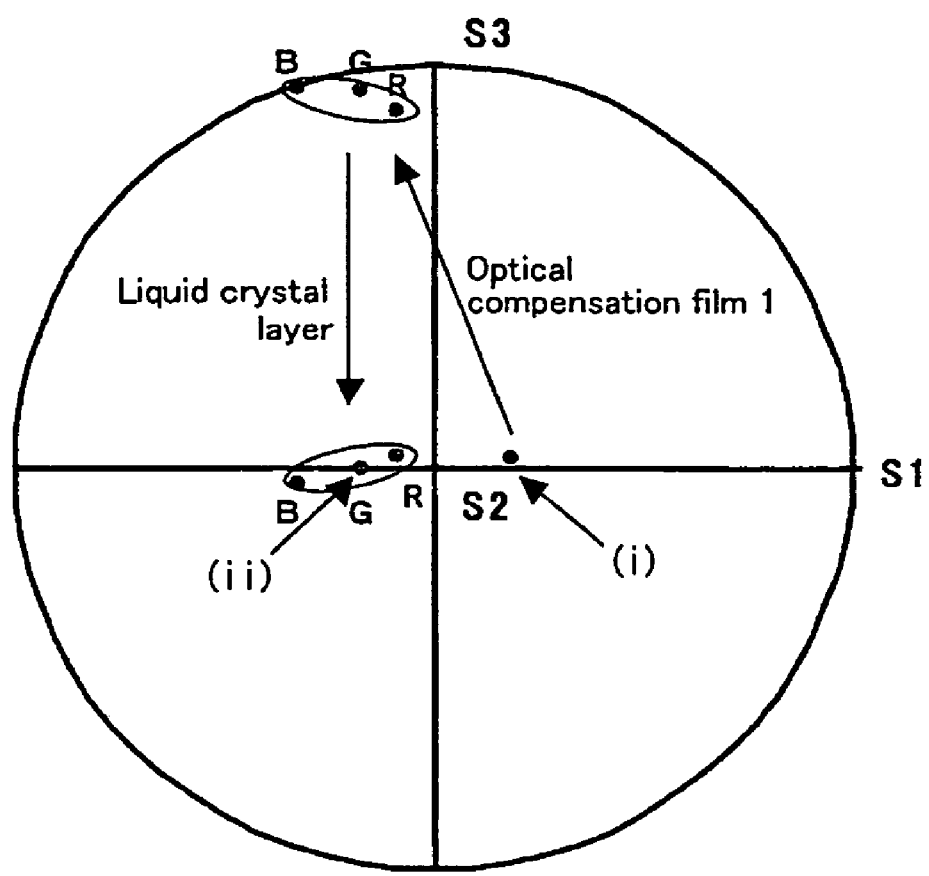
FIG. 6 is a schematic drawing of the Poincare sphere used for explaining a change in the polarization state of the incident light on an exemplary conventional liquid crystal display.

On the other hand, an example of the prior art is shown in FIG. 6. The exemplary case shown in FIG. 6 comprises an optical compensation film having a certain constant Re/Rth with respect to wavelength. In this case, even if the optical compensation film has the optical characteristics such that the start point of G light, or in other words the polarizing state of G light, before being rotated due to the retardation of the liquid-crystal layer is set on the line obtained by rotating the point (ii) around the axis S1, the start points of R light and B light can not be set on the line. The R light and B light after passing through the liquid crystal layer will therefore not change into the polarization state expressed by the point (ii), and cannot completely be intercepted by the absorption axis of the polarizing plate. This consequently results in leakage of the R light and B light, and causes color shifting in the black state. The situation will be the same if any optical film optimized only with respect to the R light or B light is used.

The present invention is characterized by providing a film with the optical characteristics such that the wavelength dispersion of retardation differs between the normal line direction of the incident light and a direction inclined therefrom, typically a direction having a polar angle of 60°. The scope of the present invention is not limited to any display mode of the liquid crystal layer, and is applicable to any liquid crystal display having a liquid crystal layer based on any display mode selected from VA mode, IPS mode, ECB mode, TN mode, OCB mode and so forth.

Next paragraphs will further detail the optical characteristics, source materials, methods for producing and so forth of the optical compensation film of the present invention.

[Optical Compensation Film]

The optical compensation film of the present invention contributes to improvement of the viewing angle contrast and reduction of the color shift depending on a viewing angle for a liquid-crystal display, especially a VA-mode liquid-crystal display. The optical compensation film may be disposed at either between an observed side polarizing plate and a liquid-crystal cell, between a backside polarizing plate and a liquid crystal cell or both of them. The optical compensation film may be employed in a liquid-crystal display as a single member or a part of a polarizing plate. For a latter embodiment, the optical compensation film may also function as a protective film of a polarizing film.

The in-plane retardation (Re) and the depth retardation (Rth) are respectively as follows:

$Re=(nx-ny)\times d_1$ $Rth=((nx+ny)/2-nz)\times d_1$

In the formulae, $d_1$(nm) is a thickness of the film, nx and ny are in-plane main mean refractive indices in parallel with the surface of the film (where, ny<nx), and nz is a depth main mean refractive index.

As described above, the optical compensation film of the present invention has Re/Rth(450 nm), a ratio of Re to Rth measured at 450 nm, 0.4 to 0.95 times, and preferably 0.6 to 0.8, as large as Re/Rth(550 nm) at 550 nm; and has Re/Rth (650 nm) at 650 nm 1.05 to 1.9 times, and preferably 1.2 to 1.7, as large as Re/Rth(550 nm) at 550 nm. The value of Re/Rth at R, G or B light preferably falls within the range from 0.1 to 0.8.

The entire depth retardation, Rth, value of the optical compensation film may be adjusted so as to cancel the retardation of the liquid-crystal layer, and, thus, the preferred range of the Rth value may be varied depending on the types of the liquid-crystal cell to be compensated. Used for optically compensating a VA-mode liquid-crystal cell, for example, having a $\Delta n\cdot d$ of 0.2 to 1.0 µm, $\Delta n\cdot d$ being a product of the thickness d (µm) and the refractive index anisotropy $\Delta n$, the Rth of the optical compensation film is preferably 70 to 400 nm, more preferably 100 to 400 nm and much more preferably 100 to 300 nm. The in-plane retardation, Re, is not to be limited to any rage, and, in usual, the Re of the optical compensation film may be 20 to 110 nm, preferably 20 to 70 nm, and more preferably 50 to 70 nm. The thickness of the optical compensation film is also not to be limited to any range, and, in usual, may be not greater than 110 µm, preferably 40 to 110 µm, more preferably 60 to 110 µm and much more preferably 80 to 110 µm.

The optical compensation film has three mean refractive indices nx, ny and nz respectively in the directions of the x-, y- and z-axes orthogonal to each other. Three these values are intrinsic refractive indices of the optical compensation film, and Rth and Re are determined by these values and thickness $d_1$ of the film. It is therefore made possible to produce an optical compensation film which satisfies the above-described optical characteristics, by appropriately selecting the source materials, amount of blending, and conditions for the fabrication, and by adjusting these values within predetermined ranges. Since nx, ny and nz differ depending on the wavelength, Rth and Re also differ depending on wavelength. The above-described optical compensation film can be produced by use of this feature.

In the present invention, there is no specific limitation on materials for composing the optical compensation film. The material may be, for example, a stretched birefringent polymer film, or may be an optically anisotropic layer formed by fixing the liquid-crystalline compound to a specific orientation. The optical compensation film is not limited to those having a single-layered structure, but may have a stacked structure having a plurality of layers stacked therein. In an embodiment of the stacked structure, materials for composing the individual layers may not be the same, but may typically be a stack of a polymer film and an optically anisotropic layer composed of a liquid-crystalline compound. In an embodiment of the stacked structure, a coating-type stack having therein a layer formed by coating is more preferable than a stack of polymer stretched films, in consideration of the thickness.

For the case where a liquid-crystalline compound is used for producing the optical compensation film, the optically anisotropic layer produced by fixing the liquid-crystalline compound, capable of having a variety of alignment modes, to a specific state of alignment can exhibit desired optical properties, in a form of a single layer or a stack of a plurality of layers. In other words, the optical compensation film may be such as comprising a substrate, and one or more optically anisotropic layers formed on the substrate. Total retardation of thus-configured optical compensation film can be adjusted based on optical anisotropy of the optically anisotropic layer. The liquid-crystalline compound can be classified into rod-like liquid crystal compound and discotic liquid crystal compound based on the molecular shapes. Each category further includes low-molecular-weight type and polymer type, both can be used in the present invention. For the case where the optical compensation film is produced using a liquid-crystalline compound, it is preferable to use the rod-like liquid crystal compound or discotic liquid crystal compound, and it is more preferable to use the rod-like liquid crystal compound having a polymerizable group, or the discotic liquid crystal compound having a polymerizable group.

The optical compensation film may also be composed of a polymer film. The polymer film may be a stretched polymer film, or a combination of a coated polymer layer and a polymer film. Materials used for the polymer film generally include synthetic polymers (e.g., polycarbonate, polysulfone, polyethersulfone, polyacrylate, polymethacrylate, norbornene resin, triacetyl cellulose). Another preferable example is a cellulose acylate-base film, formed by using a composition comprising cellulose acylate and an aromatic-ring-containing, rod-like compound (more specifically, an aromatic compound having two aromatic rings) added thereto. A polymer film having desired optical characteristics can be produced by adjusting species of the aromatic compound, amount of addition and stretching conditions for the film.

<<Cellulose Acylate Film>>

The cellulose acylate film which can be used in the present invention will be further described in detail.

It is possible- to produce a cellulose acylate film which satisfies the optical characteristics of the optical compensation film of the present invention, by adjusting species and amount of addition of the aromatic-ring-containing, rod-like compound (more specifically, an aromatic compound having two aromatic rings) to be added, or production conditions (e.g., stretching conditions for the film). A protective film for the polarizing plate is generally a cellulose acylate film. Use of the above-described cellulose acylate film for one of the protective film for the polarizing plate makes it possible to add an optical compensation function to the polarizing plate, without increasing the number of constituents.

It is also made possible to readily obtain Re/Rth which differs by wavelengths, by using two or more species of rod-like compounds each giving a maximum absorption wavelength ($\lambda$max) of shorter than 250 nm in ultraviolet absorption spectrometry.

Source cottons for cellulose acylate may be those publicly known (see JIII Journal of Technical Disclosure No. 2001-1745, for example). Synthesis of cellulose acylate may also be carried out according to the publicly-known methods (see "Mokuzai Kagaku (Wood Chemistry)", edited by Migita et al., p. 180-190, published by Kyoritsu Shuppan Co., Ltd., 1968). Viscosity mean degree of polymerization of cellulose acylate preferably falls within a range from 200 to 700, more preferably from 250 to 500, and most preferably from 250 to 350. Cellulose ester used for the present invention preferably has a narrow molecular weight distribution in terms of Mw/Mn measured by gel permeation chromatography (Mw is mass average molecular weight, and Mn is number average molecular weight). A specific value of Mw/Mn is preferably 1.5 to 5.0, more preferably 2.0 to 4.5, and most preferably 3.0 to 4.0.

There is no special limitation on the acyl group in the cellulose acylate film, wherein preferable examples include acetyl group and propionyl group, and acetyl group is particularly preferable. Degree of substitution of the entire acyl group is preferably 2.7 to 3.0, and more preferably 2.8 to-2.95. The degree of substitution of acyl group described in this patent specification refers to a value calculated conforming to ASTM D817. The acyl group is most preferably acetyl group. For the case where the cellulose acetate having acetyl group as the acyl group thereof is used, the degree of acetylation preferably falls within a range from and 59.0 to 62.5%, and more preferably from 59.0 to 61.5%. The degree of acetylation regulated within these ranges is successful in preventing Re from increasing beyond a desired value due to transfer tension during the cast spreading, in reducing in-plane variation thereof, and in suppressing variations in the retardation value depending on temperature and humidity. In view of suppressing the variations in Re and Rth, the degree of substitution by an acyl group at the 6-position is preferably adjusted to 0.9 or above.

It is also possible to adjust the wavelength dispersion characteristics, based on a fact that mixed use of two species of cellulose acetate differing in the degree of acetylation within a predetermined range makes it possible to adjust the wavelength dispersion characteristics of the retardation. In this method, as detailed in Japanese Laid-Open Patent Publication "Tokkai" No. 2001-253971, it is preferable to adjust difference (Ac1–Ac2) in the degree of acetylation between cellulose acetate having a maximum degree of acetylation (Ac1) and cellulose acetate having a minimum degree of acetylation (Ac2) within a range from 2.0 to 6.0% ($2.0\% \leq Ac1-Ac2 \leq 6.0\%$). Mean degree of acetylcation of the whole mixture preferably falls within a range from 55.0 to 61.5%. Ratio (P1/P2) of maximum viscosity mean degree of polymerization (P1) and minimum viscosity mean degree of polymerization (P2) of cellulose acetate is preferably 1 or more and less than 2 ($1 \leq P1/P2 < 2$). Viscosity mean degree of polymerization of the whole mixture preferably falls within a range from 250 to 500, and more preferably from 250 to 400.

<<Retardation Control Agent>>

The cellulose acylate film preferably contains a rod-like compound having at least two aromatic rings as a retardation control agent. The rod-like compound preferably has a straight linear molecular structure. The straight linear molecular structure herein means that the rod-like compound shows a straight linear molecular structure as a thermodynamically most stable structure. The thermodynamically most stable structure can be determined by crystallographic analysis or molecular orbital calculation. It is possible, for example, to determine a crystal structure which minimizes heat of formation of the compound, through molecular orbital calculation using a molecular orbital calculation software (e.g., WinMOPAC2000, product of FUJITSU). The linear molecular structure means that the principal chain in the molecular structure forms an angle of 140° or larger, in thus-calculated thermodynamically most stable structure.

The rod-like compound having at least two aromatic rings are preferably those represented by the formula (1) below:

$$Ar^1-L^1-Ar^2 \qquad \text{Formula (1)}$$

In the above formula (1), each of $Ar^1$ and $Ar^2$ independently represents an aromatic group, and $L^1$ represents a divalent linking group selected from alkylene group, alkenylene group, alkynylene group, —O—, —CO— and any combinations thereof.

In this specification, the term of "aromatic group" is used for any aryl groups (aromatic hydrocarbon groups), any substituted aryl groups, any aromatic heterocyclic groups, or any substituted aromatic heterocyclic groups.

The aryl group and substituted aryl group are more preferable than aromatic heterocyclic group and substituted aromatic heterocyclic group. Heterocyclic of the aromatic heterocyclic group is generally unsaturated. The aromatic heterocycle is preferably a five-membered ring, six-membered ring, or seven-membered ring, and is more preferably five-membered ring or six-membered ring. The aromatic heterocycle generally has a largest number of double bonds. The heteroatom is preferably a nitrogen atom, oxygen atom or sulfur atom, and more preferably a nitrogen atom or sulfur atom. Examples of the aromatic heterocycle include furan ring, thiophene ring, pyrrole ring, oxazole ring, isooxazole ring, thiazole ring, isothiazole ring, imidazole ring, pyrazole ring, furazan ring, triazole ring, pyran ring, pyridine ring, pyridazine ring, pyrimidine ring, pyrazine ring, and 1,3,5-triazine ring.

The aromatic ring in the aromatic group is preferably a benzene ring, furan ring, thiophene ring, pyrrole ring, oxazole ring, thiazole ring, imidazole ring, triazole ring, pyridine ring, pyrimidine ring or pyrazine ring, wherein benzene ring is particularly preferable.

Examples of the substituent group in the substituted aryl group and substituted aromatic heterocyclic group include halogen atom (F, Cl, Br, I), hydroxyl, carboxyl, cyano, amino, alkylamino group (e.g., methylamino, ethylamino, butylamino, dimethylamino), nitro, sulfo, carbamoyl, alkylcarbamoyl group (e.g., N-methylcarbamoyl, N-ethylcarbamoyl, N,N-dimethylcarbamoyl), sulfamoyl, alkylsulfamoyl group (e.g., N-methylsulfamoyl, N-ethylsulfamoyl, N,N-dimethylsulfamoyl), ureido, alkylureido group (e.g., N-methylureido, N,N-dimethylureido, N,N,N'-trimethylureido), alkyl group (e.g., methyl, ethyl, propyl, butyl, pentyl, heptyl, octyl, isopropyl, s-butyl, t-amyl, cyclohexyl, cyclopentyl), alkenyl group (e.g., vinyl, aryl, hexenyl), alkynyl group (e.g., ethynyl, butinyl), acyl group (e.g., formyl, acetyl, butylyl, hexanoyl, lauryl), acyloxy group (e.g., acetoxy, butylyloxy, hexanoyloxy, lauryloxy), alkoxy group (e.g., methoxy, ethoxy, propoxy, butoxy, pentyloxy, heptyloxy, octyloxy), aryloxy group (e.g., phenoxy), alkoxycarbonyl group (e.g., methoxycarbonyl, ethoxycarbonyl, propoxycarbonyl, butoxycarbonyl, pentyloxycarbonyl, heptyloxycarbonyl), aryloxycarbonyl group (e.g., phenoxycarbonyl), alkoxycarbonylamino group (e.g., butoxycarbonylamino, hexyloxycarbonylamino), alkylthio group (e.g., methylthio, ethylthio, propylthio, butylthio, pentylthio, heptylthio, octylthio), arylthio group (e.g., phenylthio), alkylsulfonyl group (e.g., methylsulfonyl, ethylsulfonyl, propylsulfonyl, butylsulfonyl, pentylsulfonyl, heptylsulfonyl, octylsulfonyl), amide group (e.g., actamide, butylamide group, hexylamide, laurylamide) and non-aromatic heterocyclic group (e.g., morpholyl, pyrazinyl).

The substituent group in the substituted aryl group and substituted aromatic heterocyclic group is preferably a halogen atom, cyano, carboxyl, hydroxyl, amino, alkylsubstituted amino group, acyl group, acyloxy group, amide group, alkoxycarbonyl group, alkoxy group, alkylthio group or alkyl group.

The alkyl portions and alkyl groups in the alkylamino group, alkoxycarbonyl group, alkoxy group and alkylthio group may further include a substituent group. Examples of the substituent group for the alkyl portion and alkyl group include halogen atom, hydroxyl, carboxyl, cyano, amino, alkylamino group, nitro, sulfo, carbamoyl, alkylcarbamoyl group, sulfamoyl, alkylsulfamoyl group, ureido, alkylureido group, alkenyl group, alkynyl group, acyl group, acyloxy group, alkoxy group, aryloxy group, alkoxycarbonyl group, aryloxycarbonyl group, alkoxycarbonylamino group, alkylthio group, arylthio group, alkylsulfonyl group, amide group and non-aromatic heterocyclic group. The substituent group for the alkyl portion and alkyl group is preferably a halogen atom, hydroxyl, amino, alkylamino group, acyl group, acyloxy group, acylamino group, alkoxycarbonyl group or alkoxy group.

$L^1$ represents a divalent linking group selected from alkylene group, alkenylene group, alkynylene group, —O—, —CO— and groups based on any combinations thereof.

The alkylene group may have a cyclic structure. The cyclic alkylene group is preferably cyclohexylene, and particularly preferably 1,4-cyclohexylene. As the chain-formed alkylene group, straight-chain alkylene group is more preferable than the branched alkylene group.

The number of carbon atoms of the alkylene group is preferably 1 to 20, more preferably 1 to 15, still more preferably 1 to 10, further more preferably 1 to 8, and most preferably 1 to 6.

The alkenylene group and alkynylene group preferably has a linear structure rather than a cyclic structure, and preferably has a straight-chain structure rather than a branched structure. The number of carbon atoms of the alkenylene group and alkynylene group is preferably 2 to 10, more preferably 2 to 8, still more preferably 2 to 6, further more preferably 2 to 4, and most preferably 2 (vinylene or ethynylene). The arylene group preferably has the number of carbon atoms of 6 to 20, more preferably 6 to 16, and still more preferably 6 to 12.

Examples of the divalent linking groups based on the combination are listed below:

L-1: —O—CO-alkylene group-CO—O—
L-2: —CO—O-alkylene group-O—CO—
L-3: —O—CO-alkenylene group-CO—O—
L-4: —CO—O-alkenylene group-O—CO—
L-5: —O—CO-alkynylene group-CO—O—
L-6: —CO—O-alkynylene group-O—CO—
L-7: —O—CO-arylene group-CO—O—
L-8: —CO—O-arylene group-O—CO—
L-9: —O—CO-arylene group-CO—O—
L-10: —CO—O-arylene group-O—CO—

In the molecular structure represented by the formula (1), an angle formed between $Ar^1$ and $Ar^2$, while placing $L^1$ in between, is preferably 140° or larger. As the rod-like compound, those represented by the formula (2) below are more preferable:

$$Ar^1-L^2-X-L^3-Ar^2 \qquad \text{formula (2)}$$

In the above formula (2), each of $Ar^1$ and $Ar^2$ independently represents an aromatic group. The definition and examples of the aromatic group are same as those for $Ar^1$ and $Ar^2$ in the formula (1).

In the formula (2), each of $L^2$ and $L^3$ independently represents a divalent linking group selected from alkylene group, —O—, —CO— and any combinations thereof. The alkylene group preferably has a chain-formed structure rather than a cyclic structure, and more preferably has a straight-chain structure rather than a branched structure.

The number of carbon atoms of the alkylene group is preferably 1 to 10, more preferably 1 to 8, still more preferably 1 to 6, still more preferably 1 to 4, and most preferably 1 or 2 (methylene or ethylene). It is particularly preferable that $L^2$ and $L^3$ express —O—CO— or —CO—O—.

In the formula (2), X represents 1,4-cyclohexylene, vinylene or ethynylene.

Specific examples of the compounds represented by the formula (1) will be shown below.

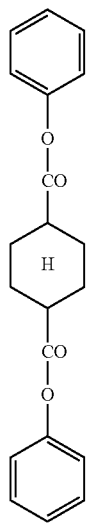

(1)

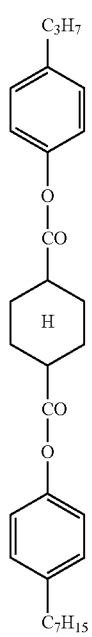

(2)

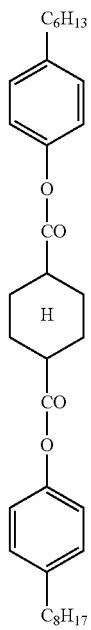

(3)

-continued

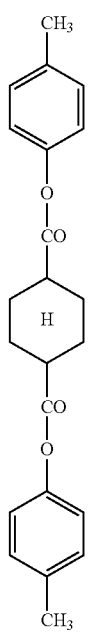

(4)

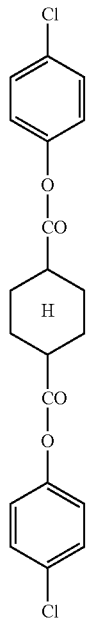
(5)
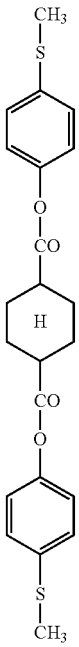
(7)
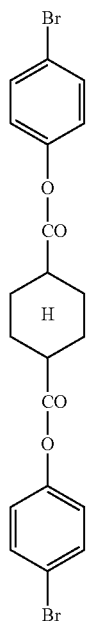
(6)
(8)

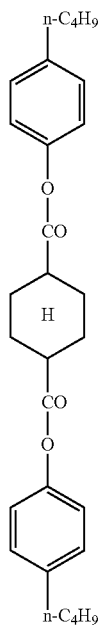 (9)
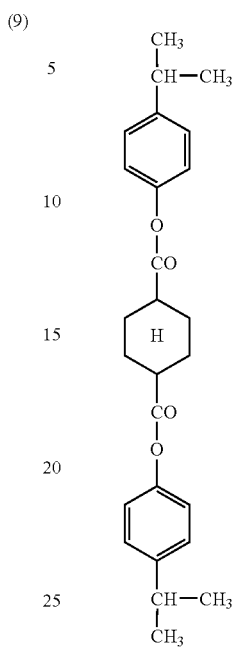 (11)
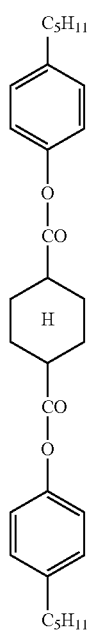 (10)
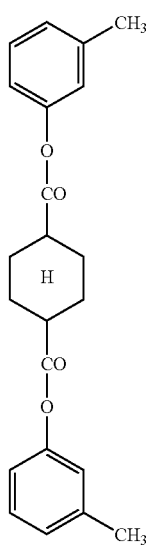 (12)

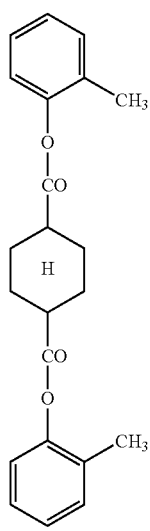
(13)
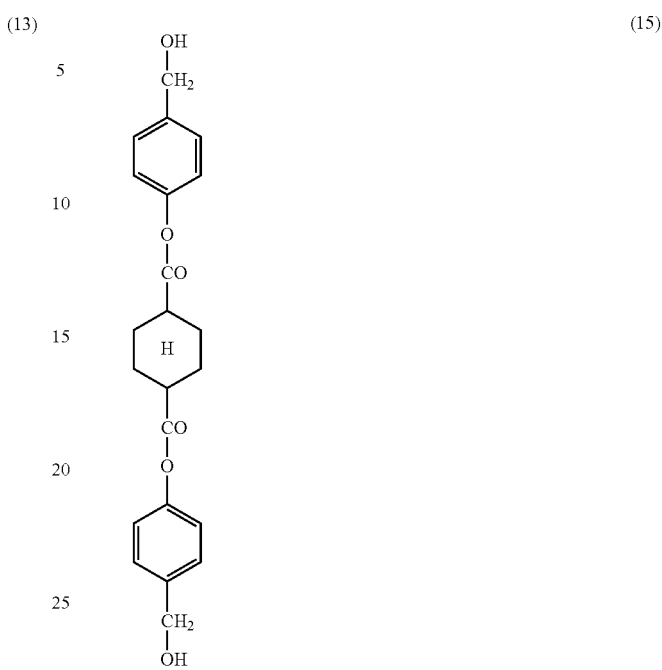
(15)
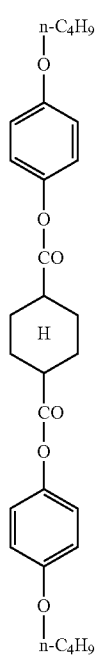
(14)
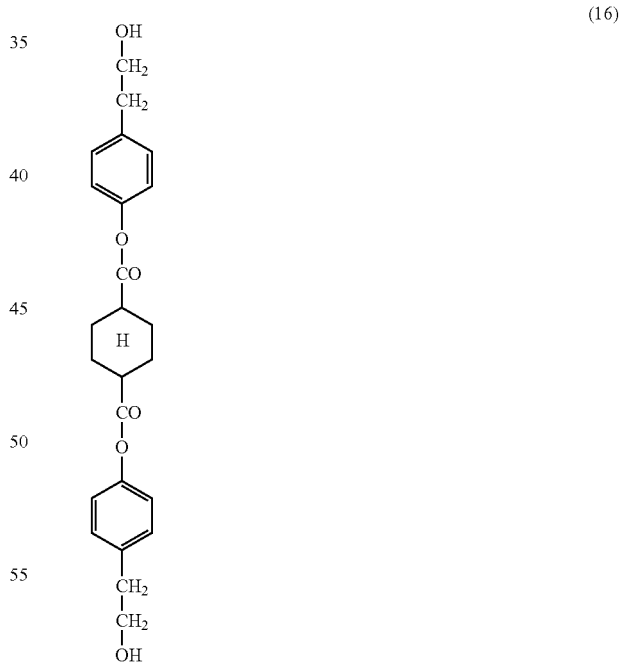
(16)

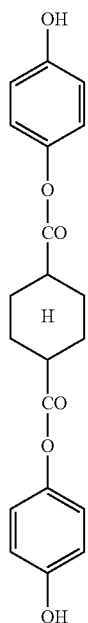
(17)
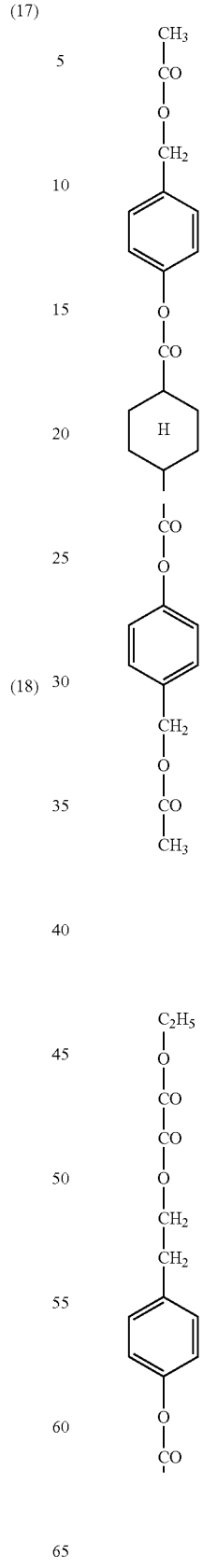
(18)
(19)
(20)

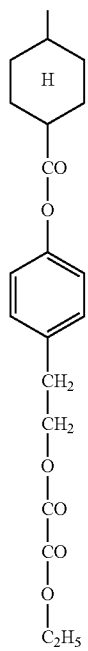
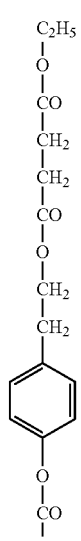
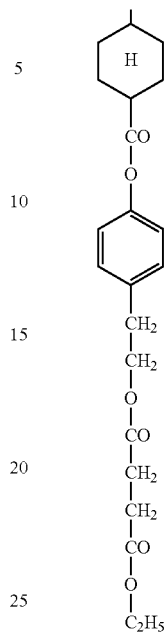
(21)
(22)

-continued
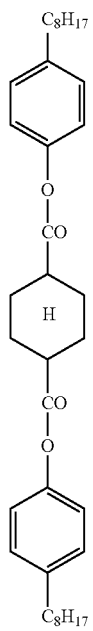
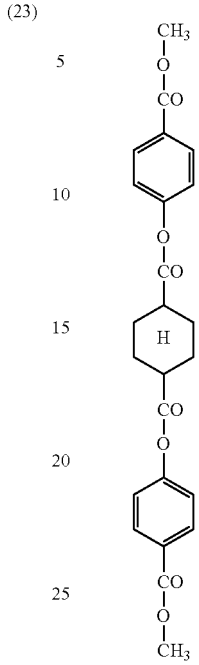
(23)
(25)
(26)
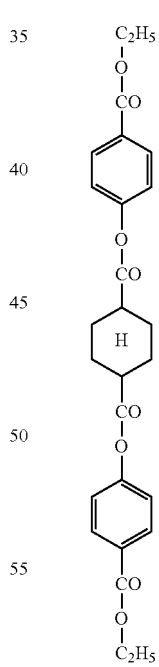

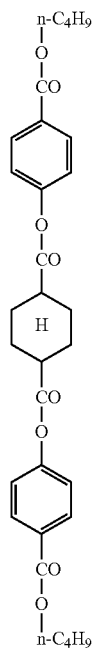 (27)
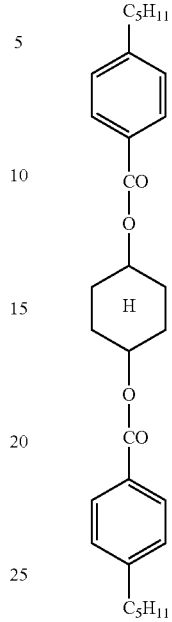 (29)
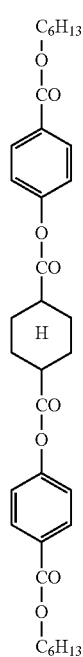 (28)
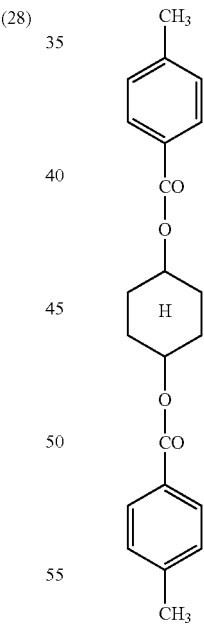 (30)

-continued
(31)
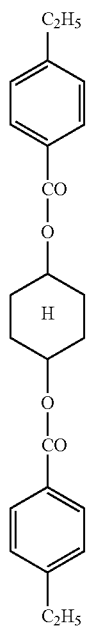
(33)
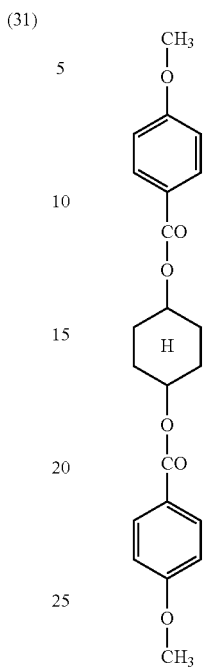
(32)
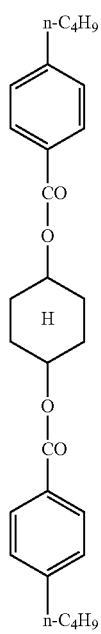
(34)

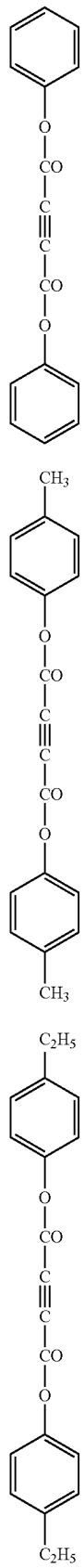
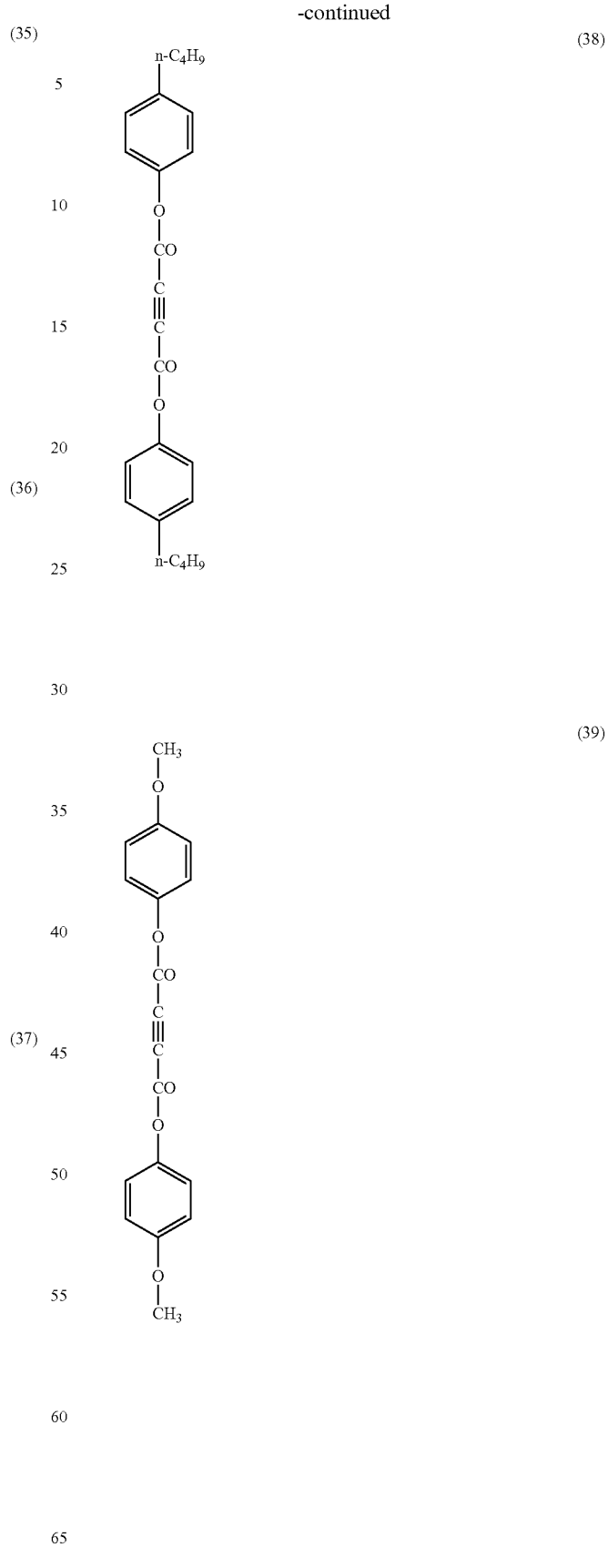

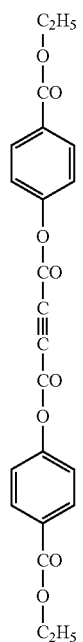 (40)
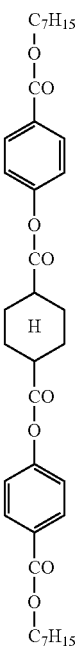 (42)
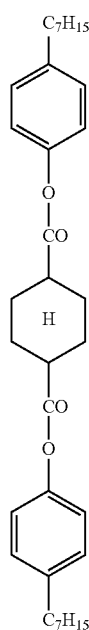 (41)
 (43)

-continued

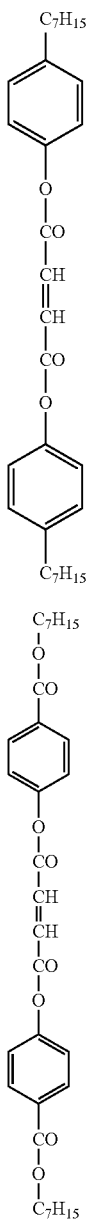

(44)

(45)

Specific examples (1)-(34), (41), (42) have two asymmetric carbon atoms at the 1-position and 4-position of cyclohexane ring. It is to be noted that the specific examples (1), (4)-(34), (41), (42), having symmetric meso-form molecular structure, have no isomers (optically inactive), and can exist only in forms of geometric isomers (trans-form and cis-form). Trans-form (1-trans) and cis-form (1-cis) isomers of the specific example (1) are listed below.

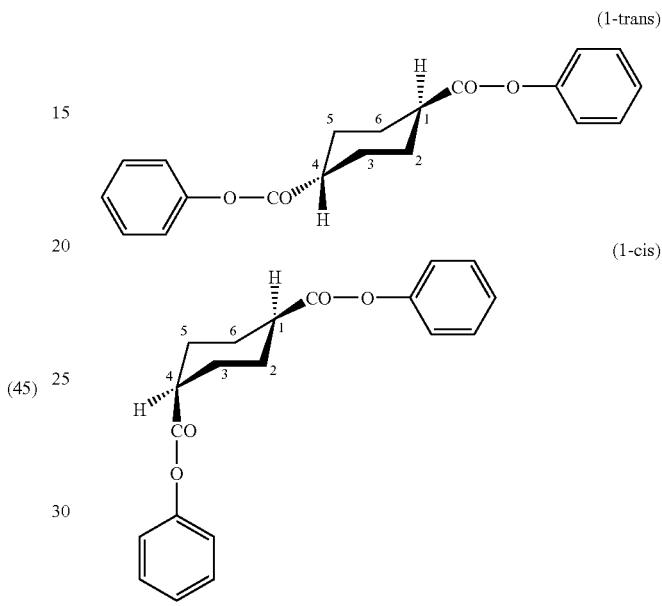

(1-trans)

(1-cis)

As described in the above, the rod-like compound preferably has a linear molecular structure. For this reason, the trans-form is more preferable than the cis-form. The specific examples (2) and (3) have optical isomers (total 4 isomers), in addition to geometric isomers. As for the geometric isomers, the trans-form is more preferable than the cis-form, similarly to as described in the above. There is no specific priority as for the optical isomers, wherein any of D-, L- and racemic compounds are allowable. The specific examples (43)-(45) have the trans-form and cis-form ascribable to the center vinylene bond, wherein the trans-form is more preferable than the cis-form based on the reason described in the above.

Other preferable compounds applicable to the retardation control agent are listed below:

(46)

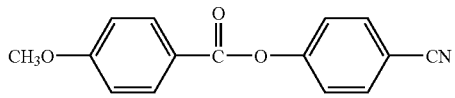

(47)

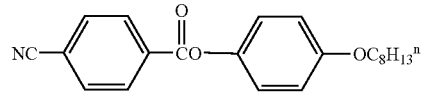

(48)

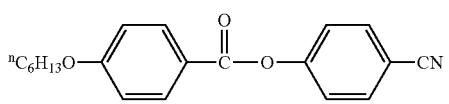

(49)

(50)

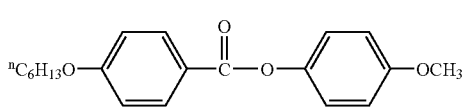

(51)

-continued

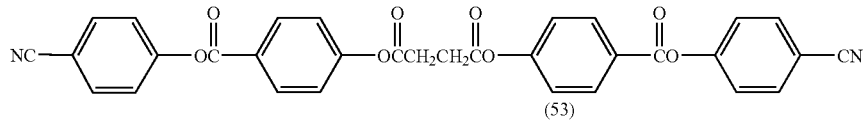
(52)

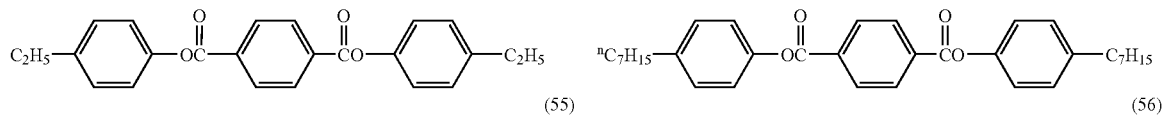
(53)
(54)

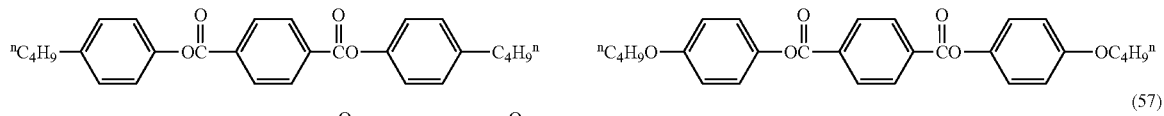
(55)
(56)

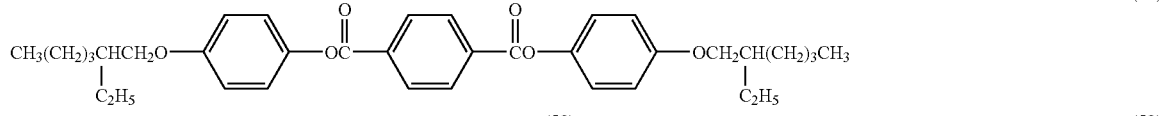
(57)

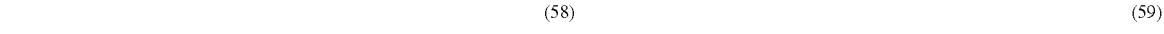
(58)
(59)

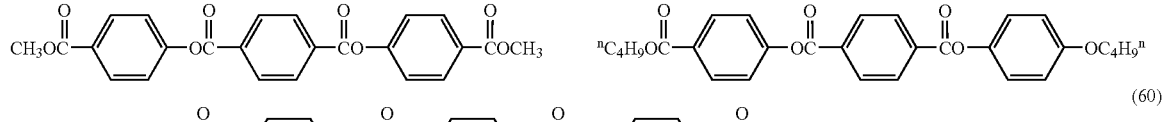
(60)

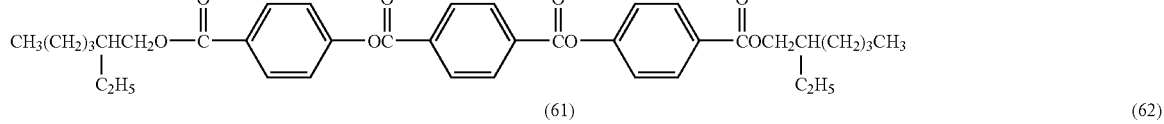
(61)
(62)

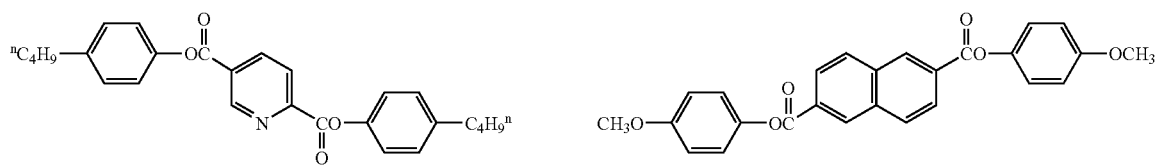

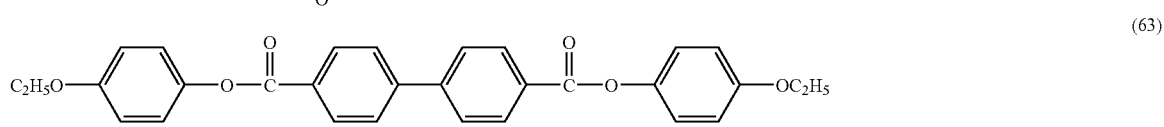
(63)

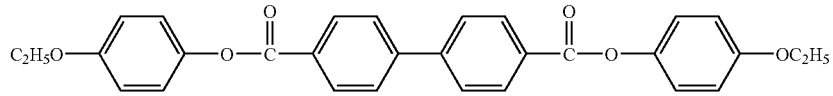

As the retardation control agent, it is preferable to use two or more species of the rod-like compounds in combination, a solution sample of each of which showing a maximum absorption wavelength (λmax) of shorter than 250 nm in ultraviolet absorption spectrometry. The rod-like compound can be synthesized according to methods described elsewhere in literatures. The literatures include Mol. Cryst. Liq. Cryst., Vol. 53, p. 229 (1979), ditto Vol. 89, p. 93 (1982), ditto Vol. 145, p. 111 (1987), ditto Vol. 170, p. 43 (1989), J. Am. Chem. Soc., Vol. 113, p. 1349 (1991), ditto Vol. 118, p. 5346 (1996), ditto Vol. 92, p. 1582 (1970), J. Org. Chem., Vol. 40, p. 420 (1975), and Tetrahedron, Vol. 48, No. 16, p. 3437 (1992).

Amount of addition of the retardation control agent is preferably 0.1 to 30 weight % of amount of the polymer, and more preferably 0.5 to 20 weight %.

The aromatic compound is used within a range from 0.01 to 20 weight parts per 100 weight parts of cellulose acylate. The aromatic compound is preferably used in an amount of 0.05 to 15 weight parts per 100 weight parts of cellulose acylate, and more preferably in an amount of 0.1 to 10 weight parts. Mixed use of two or more species of the compounds is also allowable.

<<Wavelength Dispersion Adjusting Agent>>

The cellulose acylate film preferably has a compound for reducing the wavelength dispersion of the film contained therein. The present inventors found out after extensive investigations that making the cellulose acylate film contain a compound which shows absorption in the ultraviolet region from 200 to 400 nm makes it possible to adjust the wavelength dispersion of Re and Rth so as to satisfy the above-described relations.

Values of Re and Rth of the cellulose acylate film generally show wavelength dispersion characteristics such as being increased on the longer wavelength side than on the shorter wavelength side. It is therefore necessary to smoothen the wavelength dispersion by increasing relatively small values of Re and Rth on the shorter wavelength side. On the other hand, the compound having an absorption in the ultraviolet region from 200 to 400 nm shows wavelength dispersion characteristics such as having larger absorbance on the longer wavelength side than on the shorter wavelength side. If the compound per se can isotropically distribute in the cellulose acylate film, birefringence of the compound per se, and consequently the wavelength dispersions of Re and Rth, are supposed to be larger on the shorter wavelength side, similarly to the wavelength dispersion of the absorbance.

It is therefore made possible to adjust the wavelength dispersion of Re and Rth of the cellulose acylate film, by using the above-described compound having absorption in the ultraviolet region from 200 to 400 nm, and having the wavelength dispersions of Re and Rth of the compound per se supposed to be larger on the shorter wavelength side. The absorption band of this sort of compound in the ultraviolet region preferably resides in a range from 200 to 400 nm, more preferably from 220 to 395 nm, and still more preferably 240 to 390 nm. It is also necessary that the compound used for adjusting the wavelength dispersion is fully compatible with cellulose acylate.

In these years, there are demands on higher luminance with fewer power consumption of the liquid crystal display for television set, notebook-type personal computer and mobile terminal and so forth, and this consequently demands a higher transmittance of optical materials used for the liquid crystal display. From this point of view, the compounds added to the cellulose acylate film must be excellent in the spectral transmittance. The cellulose acylate film preferably has a spectral transmittance at 380 nm of 45% to 95%, both ends inclusive, and a spectral transmittance at 350 nm of 10% or less.

For the case where the cellulose acylate film is produced by a method involving heating process, such as a solvent cast process, it is preferable that the wavelength dispersion adjusting agent is not volatile in the process of cast spreading of a dope, drying and so forth. From the viewpoint of volatility, the wavelength dispersion adjusting agent preferably has a molecular weight of 250 to 1000, more preferably 260 to 800, still more preferably 270 to 800, and particularly preferably 300 to 800. The agent may have a monomer structure, or may have an oligomer structure or a polymer structure composed of a plurality of such monomer units bonded to each other, so far as the molecular weight thereof falls within the above-described ranges.

Amount of addition of the above-described wavelength dispersion adjusting agent preferably used in the present invention is preferably 0.01 to 30% by weight of the cellulose acylate, more preferably 0.1 to 30% by weight, still more preferably 0.1 to 20% by weight, and particularly preferably 0.2 to 10% by weight.

The wavelength dispersion adjusting agent may be used independently, or in a mixed manner based on an arbitrary ratio of mixing of two or more compounds. When the wavelength dispersion adjusting agent should be added is not specifically limited. For the case where the cellulose acylate film is fabricated by the solvent cast method, the agent may be added during the dope preparation process, or at the end of the dope preparation process.

Specific examples of the wavelength dispersion adjusting agent preferably used in the present invention include benzotriazole-base compounds, benzophenone-base compounds, cyano-group-containing compounds, oxybenzophenone-base compounds, salicilic-acid-ester-base compounds and nickel complex salt-base compounds, wherein the present invention is by no means limited to these compounds.

Preferable examples of the wavelength dispersion adjusting agent are those represented by the formula (3) below:

  formula (3)

where, $Q^1$ represents a nitrogen-containing aromatic heterocycle, and $Q^2$ represents an aromatic ring.

The nitrogen-containing aromatic heterocycle represented by $Q^1$ is preferably a five-to-seven-membered, nitrogen-containing aromatic heterocycle, and more preferably five- or six-membered, nitrogen-containing aromatic heterocycle, wherein examples thereof include imidazole, pyrazole, triazole, tetrazole, thiazole, oxazole, selenazole, benzotriazole, benzothiazole, benzoxazole, benzoselenazole, thiadiazole, oxadiazole, naphthothiazole, naphthooxazole, azabenzimidazole, purine, pyridine, pyrazine, pyrimidine, pyridazine, triazine, triazaindene and tetrazaindene. Among others, the five-membered, nitrogen-containing aromatic heterocycle is preferable, wherein specific examples thereof include imidazole, pyrazole, triazole, tetrazole, thiazole, oxazole, benzotriazole, benzothiazole, benzoxazole, thiadiazole, and oxadiazole. Benzotriazole is particularly preferable. The nitrogen-containing aromatic heterocycle represented by $Q^1$ may further has a substituent group, wherein substituent group T described later is applicable as the substituent group. For the case of having a plurality of substituent groups, the individual substituent groups may bond to each other to thereby form condensed rings.

The aromatic ring represented by $Q^2$ may be an aromatic hydrocarbon ring or may be an aromatic heterocycle. The aromatic ring may be monocycle, or may further form a condensed ring with other ring. The aromatic hydrocarbon ring is preferably a monocyclic or bicyclic aromatic hydrocarbon ring having the number of carbon atoms of 6 to 30 (e.g., benzene ring, naphthalene ring), more preferably an aromatic hydrocarbon ring having the number of carbon atoms of 6 to 20, still more preferably an aromatic hydrocarbon ring having the number of carbon atoms of 6 to 12, and further more preferably a benzene ring.

The aromatic heterocycle is preferably a nitrogen-atom-containing or sulfur-atom-containing aromatic heterocycle. Specific examples of the aromatic heterocycle include thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthylidine, quinoxaline, quinazoline, cinnoline, pteridine, acridine, phenanthroline, phenazine, tetrazole, benzimidazole, benzoxazole, benzthiazole, benzotriazole and tetrazaindene. The aromatic heterocycle is preferably pyridine, triazine or quinoline. $Q^2$ preferably represents an aromatic hydrocarbon ring, more preferably represents a naphthalene ring or benzene ring, and particularly preferably represents a benzene ring.

Each of $Q^1$ and $Q^2$ may further have a substituent group which is preferably selected from the substituent group T listed below.

Substituent Group T:
an alkyl group (desirably $C_{1-20}$, more desirably $C_{1-12}$ and much more desirably $C_{1-8}$ alkyl group) such as methyl, ethyl, isopropyl, tert-butyl, n-octyl, n-decyl, n-hexadecyl, cyclopropyl, cyclopentyl or cyclohexyl; an alkenyl group (desirably $C_{2-20}$, more desirably $C_{2-12}$ and much more desirably $C_{2-8}$ alkenyl group) such as vinyl, allyl, 2-butenyl or 3-pentenyl; an alkynyl group (desirably $C_{2-20}$, more desirably $C_{2-12}$ and much more desirably $C_{2-8}$ alkynyl group) such as propargyl or 3-pentynyl; an aryl group (desirably $C_{6-30}$, more desirably $C_{6-20}$ and much more desirably $C_{6-12}$ aryl group) such as phenyl, p-methylphenyl or naphthyl; an aralkyl group (desirably $C_{7-30}$, more desirably $C_{7-20}$ and much more desirably $C_{7-12}$ aralkyl group) such as benzyl, phenethyl or 3-phenylpropyl; a substituted or unsubstituted amino group (desirably $C_{0-20}$, more desirably $C_{0-10}$ and much more desirably $C_{0-6}$ amino group) such as unsubstituted amino, methylamino, dimethylamino, diethylamino or anilino; an alkoxy group (desirably $C_{1-20}$, more desirably $C_{1-16}$ and much more desirably $C_{1-10}$ alkoxy group) such as methoxy, ethoxy or butoxy; an alkoxycarbonyl group (desirably $C_{2-20}$, more desirably $C_{2-16}$ and much more desirably $C_{2-10}$ alkoxy carbonyl group) such as methoxycarbonyl or ethoxycarbonyl; an acyloxy group (desirably $C_{2-20}$, more desirably $C_{2-16}$ and much more desirably $C_{2-10}$ acyloxy group) such as acetoxy or benzoyloxy; an acylamino group (desirably $C_{2-20}$, more desirably $C_{2-16}$ and much more desirably $C_{2-10}$ acylamino group) such as acetylamino or benzoylamino; an alkoxycarbonylamino group (desirably $C_{2-20}$, more desirably $C_{2-16}$ and much more desirably $C_{2-12}$ alkoxycarbonylamino group) such as methoxycarbonyl amino; an aryloxycarbonylamino group (desirably $C_{7-20}$, more desirably $C_{7-16}$ and much more desirably $C_{7-12}$ aryloxycarbonylamino group) such as phenyloxycarbonyl amino group; a sulfonylamino group (desirably $C_{1-20}$, more desirably $C_{1-16}$ and much more desirably $C_{1-12}$ sulfonylamino group) such as methylsulfonylamino group or benzenesulfonylamino group; a sulfamoyl group (desirably $C_{0-20}$, more desirably $C_{0-16}$ and much more desirably $C_{0-12}$ sulfamoyl group) such as unsubstituted sulfamoyl, methylsulfamoyl, dimethylsulfamoyl or phenylsulfamoyl; a carbamoyl group (desirably $C_{1-20}$, more desirably $C_{-16}$ and much more desirably $C_{1-12}$ carbamoyl group) such as unsubstituted carbamoyl, methylcarbamoyl, diethylcarbamoyl or phenylcarbamoyl; an alkylthio group (desirably $C_{1-20}$, more desirably $C_{1-16}$ and much more desirably $C_{1-12}$ alkylthio group) such as methylthio or ethylthio; an arylthio group (desirably $C_{6-20}$, more desirably $C_{6-16}$ and much more desirably $C_{6-12}$ arylthio group) such as phenylthio; a sulfonyl group (desirably $C_{1-20}$, more desirably $C_{1-16}$ and much more desirably $C_{1-12}$ sulfonyl group) such as mesyl or tosyl; a sulfinyl group (desirably $C_{1-20}$, more desirably $C_{1-16}$ and much more desirably $C_{1-12}$ sulfinyl group) such as methane sulfinyl or benzenesulfinyl; an ureido group (desirably $C_{1-20}$, more desirably $C_{1-16}$ and much more desirably $C_{1-12}$ ureido group) such as unsubstituted ureido, methylureido or phenylureido; a phosphoric amide (desirably $C_{1-20}$, more desirably $C_{1-6}$ and much more desirably $C_{1-12}$ phosphoric amide) such as diethylphosphoric amide or phenylphosphoric amide; a hydroxy group, a mercapto group, a halogen atom such as fluorine, chlorine, bromine or iodine; a cyano group, a sulfo group, a carboxyl group, a nitro group, a hydroxamic acid group, a sulfino group, a hydrazino group, an imino group, a hetero cyclic group (desirably $C_{1-30}$ and more desirably $C_{1-12}$ heterocyclic group comprising at least one hetero atom such as nitrogen, oxygen or sulfur) such as imidazolyl, pyridyl, quinolyl, furyl, piperidyl, morpholino, benzoxazolyl, benzimidazolyl or benzthiazolyl; and a silyl group (desirably $C_{3-40}$, more desirably $C_{3-30}$ and much more desirably $C_{3-24}$ silyl group) such as trimethylsilyl or triphenylsilyl.

These substituents may be substituted by at least one substitutent selected from these. When two substituents are selected, they may be same or different each other. Two or more may, if possible, bond each other to form a ring.

Among the compounds represented by the formula (3), triazole compounds represented by a formula (3-A) are preferred.

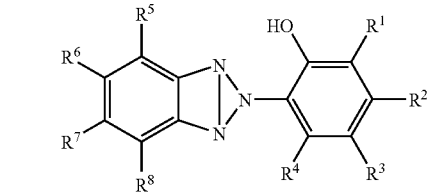

Formula (3-A)

In the formula, $R^1$, $R^2$, $R^3$, $R^4$, $R^5$, $R^6$, $R^7$ and $R^8$ respectively represent a hydrogen atom or a substituent group.

The substituent represented by $R^1$, $R^2$, $R^3$, $R^4$, $R^5$, $R^6$, $R^7$ or $R^8$ is selected from Substituent Group T described above. The substituent may be substituted with at least one substituent group or form a condensed ring by bonding each other.

It is preferred that $R^1$ and $R^3$ respectively represent a hydrogen atom, an alkyl group, an alkenyl group, an alkynyl group, an aryl group, a substituted or non-substituted amino group, an alkoxy group, an aryloxy group, a hydroxy group or a halogen atom; it is more preferred that $R^1$ and $R^3$ respectively represent a hydrogen atom, an alkyl group, an aryl group, an alkoxy group, an aryloxy group or a halogen atom; it is much more preferred that $R^1$ and $R^3$ respectively represent a hydrogen atom or a $C_{1-12}$ alkyl group; and it is further much more preferred that $R^1$ and $R^3$ respectively represent a $C_{1-12}$ (preferably $C_{4-12}$) alkyl group.

It is preferred that $R^2$ and $R^4$ respectively represent a hydrogen atom, an alkyl group, an alkenyl group, an alkynyl group, an aryl group, a substituted or non-substituted amino group, an alkoxy group, an aryloxy group, a hydroxy group or a halogen atom; it is more preferred that $R^2$ and $R^4$ respectively represent a hydrogen atom, an alkyl group, an aryl group, an alkoxy group, an aryloxy group or a halogen atom; it is much more preferred that $R^2$ and $R^4$ respectively represent a hydrogen atom or a $C_{1-12}$ alkyl group; it is further much more preferred that $R^2$ and $R^4$ respectively represent a hydrogen atom or methyl; and it is most preferred that $R^2$ and $R^4$ respectively represent a hydrogen atom.

It is preferred that $R^5$ and $R^8$ respectively represent a hydrogen atom, an alkyl group, an alkenyl group, an alkynyl group, an aryl group, a substituted or non-substituted amino group, an alkoxy group, an aryloxy group, a hydroxy group or a halogen atom; it is more preferred that $R^5$ and $R^8$ respectively represent a hydrogen atom, an alkyl group, an aryl group, an alkoxy group, an aryloxy group or a halogen atom; it is much more preferred that $R^5$ and $R^8$ respectively represent a hydrogen atom or a $C_{1-12}$ alkyl group; it is further much more preferred that $R^5$ and $R^8$ respectively represent a hydrogen atom or methyl; and it is most preferred that $R^5$ and $R^8$ respectively represent a hydrogen atom.

It is preferred that $R^6$ and $R^7$ respectively represent a hydrogen atom, an alkyl group, an alkenyl group, an alkynyl group, an aryl group, a substituted or non-substituted amino group, an alkoxy group, an aryloxy group, a hydroxy group or a halogen atom; it is more preferred that $R^6$ and $R^7$ respectively represent a hydrogen atom, an alkyl group, an aryl group, an alkoxy group, an aryloxy group or a halogen atom; it is much more preferred that $R^6$ and $R^7$ respectively represent a hydrogen atom or a halogen atom; and it is further much more preferred that $R^6$ and $R^7$ respectively represent a hydrogen atom or a chlorine.

Among the compounds represented by the formula (3-A), the compounds represented by a formula (3-B) are more preferred.

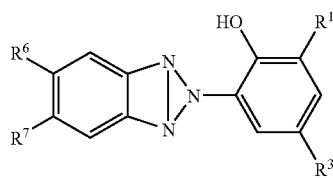
Formula (3-B)
In the formula, $R^1$, $R^3$, $R^6$ and $R^7$ are respectively same as those in the formula (3-A), and the preferred scopes of them are also same.
Examples of the compound represented by the formula (3) include, however not to be limited to, those shown below.
UV-1
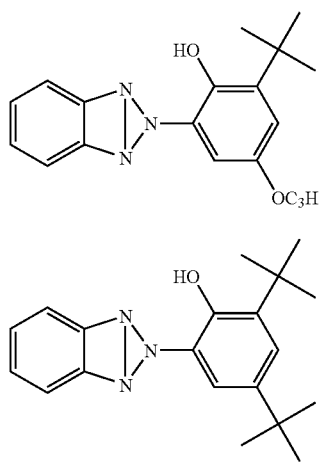
UV-2
UV-3
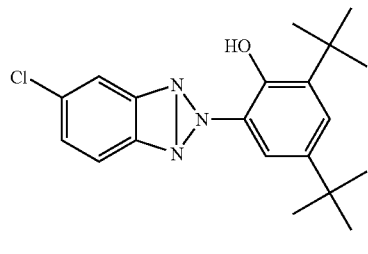
UV-4
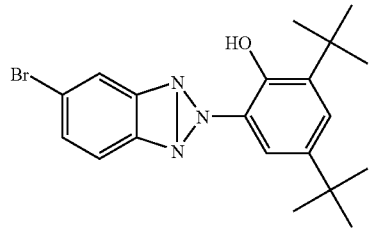
UV-5
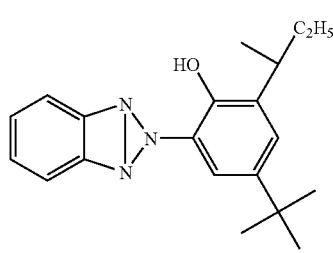
U-6
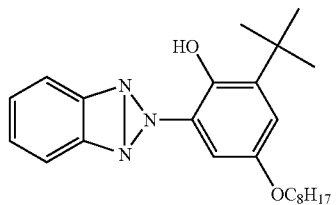
UV-7
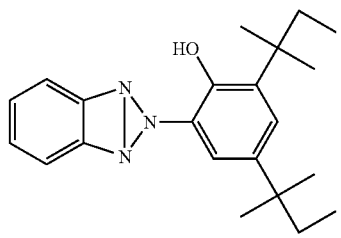
UV-8
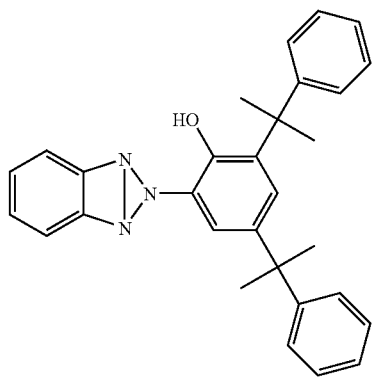
UV-9
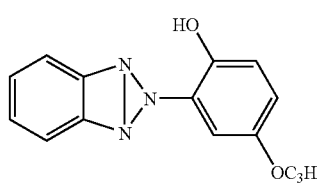
UV-10
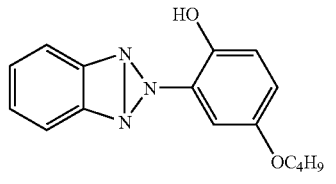
UV-11
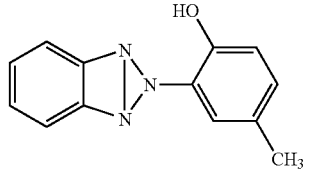
UV-12
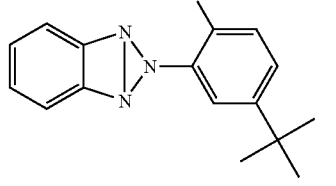

-continued

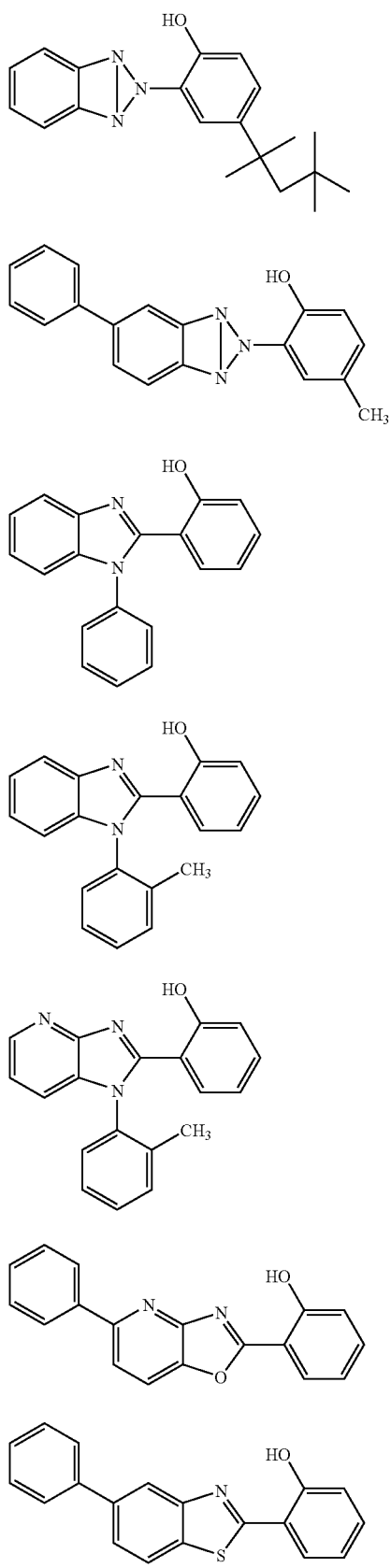

UV-13
UV-14
UV-15
UV-16
UV-17
UV-18
UV-19

-continued

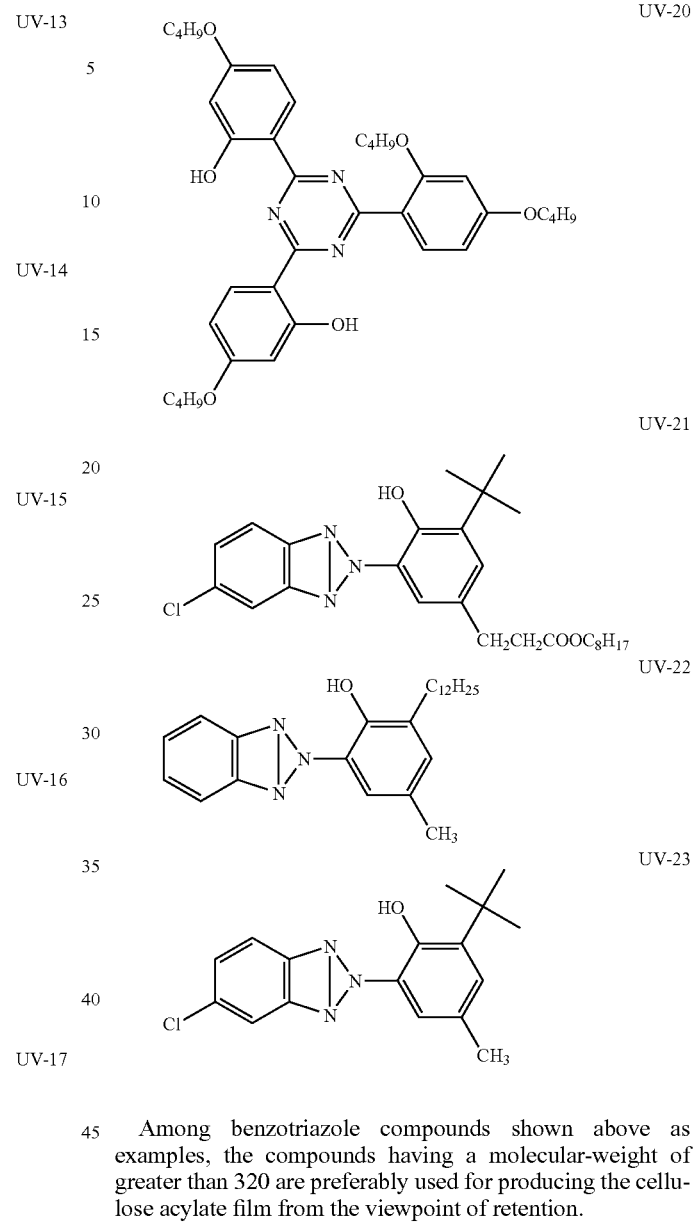

UV-20
UV-21
UV-22
UV-23

Among benzotriazole compounds shown above as examples, the compounds having a molecular-weight of greater than 320 are preferably used for producing the cellulose acylate film from the viewpoint of retention.

One of other preferable examples of the wavelength dispersion adjusting agent is a compound represented by the formula (4) below.

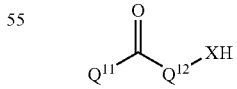

Formula (4)

In the formula, $Q^{11}$ and $Q^{12}$ independently represent an aromatic ring, and X represents NR (R is a hydrogen atom or a substituent group), oxygen atom or sulfur atom.

The aromatic ring represented by $Q^{11}$ and $Q^{12}$ may be an aromatic hydrocarbon ring or may be an aromatic heterocycle. The aromatic ring may be monocycle, or may further form a condensed ring with other ring. The aromatic hydrocarbon ring represented by $Q^{11}$ and $Q^{12}$ is preferably a monocyclic or bicyclic aromatic hydrocarbon ring having the number of carbon atoms of 6 to 30 (e.g., benzene ring, naphthalene ring), more preferably an aromatic hydrocarbon ring having the number of carbon atoms of 6 to 20, still more preferably an aromatic hydrocarbon ring having the number of carbon atoms of 6 to 12, and further more preferably a benzene ring. The aromatic heterocycle represented by $Q^{11}$ and $Q^{12}$ may be an aromatic heterocycle preferably containing at least any one of an oxygen atom, nitrogen atom and sulfur atom. Specific examples of the heterocycle include furan, pyrrole, thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthylidine, quinoxaline, quinazoline, cinnoline, pteridine, acridine, phenanthroline, phenazine, tetrazole, benzimidazole, benzoxazole, benzthiazole, benzotriazole and tetrazaindene. The aromatic heterocycle is preferably pyridine, triazine or quinoline. Each of $Q^{11}$ and $Q^{12}$ preferably represents an aromatic hydrocarbon ring, more preferably an aromatic hydrocarbon ring having the number of carbon atoms of 6 to 10, and still more preferably a substituted or non-substituted benzene ring. Each of $Q^{11}$ and $Q^{12}$ may further have a substituent group. The substituent group may preferably be selected from the substituent group T listed below, but never contain carboxylic acid, sulfonic acid or quaternary ammonium salt. A plurality of the substituent group may bind with each other to produce a cyclic structure.

X is preferably NR (R represents a hydrogen atom or a substituent group. The above-described substituent group T is applicable to the substituent group), oxygen atom or sulfur atom, wherein X is preferably NR (R is preferably an acyl group or sulfonyl group, and these substituent groups may further be substituted), or O, and particularly preferably O.

Among the compounds represented by the formula (4), the benzophenone compounds represented by a formula (4-A) are preferred.

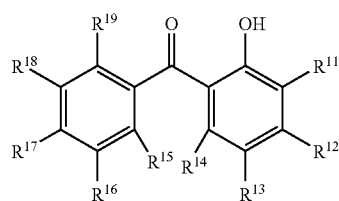

Formula (4-A)

In the formula, $R^{11}$, $R^{12}$, $R^{13}$, $R^{14}$, $R^{15}$, $R^{16}$, $R^{17}$, $R^{18}$ and $R^{19}$ respectively represent a hydrogen atom or a substituent.

The substituent represented by $R^{11}$, $R^{12}$, $R^{13}$, $R^{14}$, $R^{15}$, $R^{16}$, $R^{17}$, $R^{18}$ or $R^{19}$ is selected from Substituent Group T described above. The substituent may be substituted with at least one substituent group or form a condensed ring by bonding each other.

It is preferred that $R^{11}$, $R^{13}$, $R^{14}$, $R^{15}$, $R^{16}$, $R^{18}$ and $R^{19}$ respectively represent a hydrogen atom, an alkyl group, an alkenyl group, an alkynyl group, an aryl group, a substituted or non-substituted amino group, an alkoxy group, an aryloxy group, a hydroxy group or a halogen atom; it is more preferred that $R^{11}$, $R^{13}$, $R^{14}$, $R^{15}$, $R^{16}$, $R^{18}$ and $R^{19}$ respectively represent a hydrogen atom, an alkyl group, an aryl group, an alkoxy group, an aryloxy group or a halogen atom; it is much more preferred that $R^{11}$, $R^{13}$, $R^{14}$, $R^{15}$, $R^{16}$, $R^{18}$ and $R^{19}$ respectively represent a hydrogen atom or a $C_{1-12}$ alkyl group; it is further much more preferred that $R^{11}$, $R^{13}$, $R^{14}$, $R^{15}$, $R^{16}$, $R^{18}$ and $R^{19}$ respectively represent a hydrogen atom or methyl; and it is most preferred that $R^{11}$, $R^{13}$, $R^{14}$, $R^{15}$, $R^{16}$, $R^{18}$ and $R^{19}$ respectively represent a hydrogen atom.

It is preferred that $R^{12}$ represents a hydrogen atom, an alkyl group, an alkenyl group, an alkynyl group, an aryl group, a substituted or non-substituted amino group, an alkoxy group, an aryloxy group, a hydroxy group or a halogen atom; it is more preferred that $R^{12}$ represents a hydrogen atom, a $C_{1-20}$ alkyl group, a $C_{0-20}$ amino group, a $C_{1-20}$ alkoxy group, a $C_{6-12}$ aryloxy group or a hydroxy group; it is much more preferred that $R^{12}$ represents a $C_{1-20}$ alkoxy group; and it is further much more preferred that $R^{12}$ represents a $C_{1-12}$ alkoxy group.

It is preferred that $R^{17}$ represents a hydrogen atom, an alkyl group, an alkenyl group, an alkynyl group, an aryl group, a substituted or non-substituted amino group, an alkoxy group, an aryloxy group, a hydroxy group or a halogen atom; it is more preferred that $R^{17}$ represents a hydrogen atom, a $C_{1-20}$ alkyl group, a $C_{0-20}$ amino group, a $C_{1-20}$ alkoxy group, a $C_{6-12}$ aryloxy group or a hydroxy group; it is much more preferred that $R^{17}$ represents a hydrogen atom or a $C_{1-20}$ (desirably $C_{1-12}$, more desirably $C_{1-8}$ and much more desirably methyl) alkyl group; and it is further much more preferred that $R^{17}$ represents a hydrogen atom or methyl.

Among the compounds represented by the formula (4-A), the benzophenone compounds represented by a formula (4-B) are preferred.

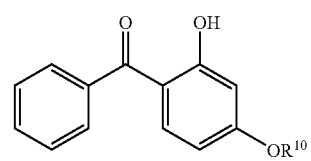

Formula (4-B)

In the formula, $R^{10}$ represents a hydrogen atom, a substituted or non-substituted alkyl group, a substituted or non-substituted alkenyl group, a substituted or non-substituted alkynyl group or substituted or non-substituted aryl group.

The substituent is selected from Substituent Group T shown above.

It is preferred that $R^{10}$ represents a substituted or non-substituted alkyl group; it is more preferred that $R^{10}$ represents a $C_{5-20}$ substituted or non-substituted alkyl group; it is much more preferred that $R^{10}$ represents $C_{5-12}$ substituted or non-substituted alkyl group such as n-hexyl, 2-ethylhexyl, n-octyl, n-decyl, n-dodecyl or benzyl; and it is further more preferred that $R^{10}$ represents a $C_{6-12}$ substitute or non-substituted alkyl group such as 2-ethylhexyl, n-octyl, n-decyl, n-dodecyl or benzyl.

The compounds represented by the formula (4) can be synthesized by a publicly-known method disclosed in Japanese Laid-Open Patent Publication "Tokkaihei" No. 11-12219.

Specific examples of the compounds represented by the formula (4) will be listed below, wherein the present invention is by no means limited to the specific examples listed below.

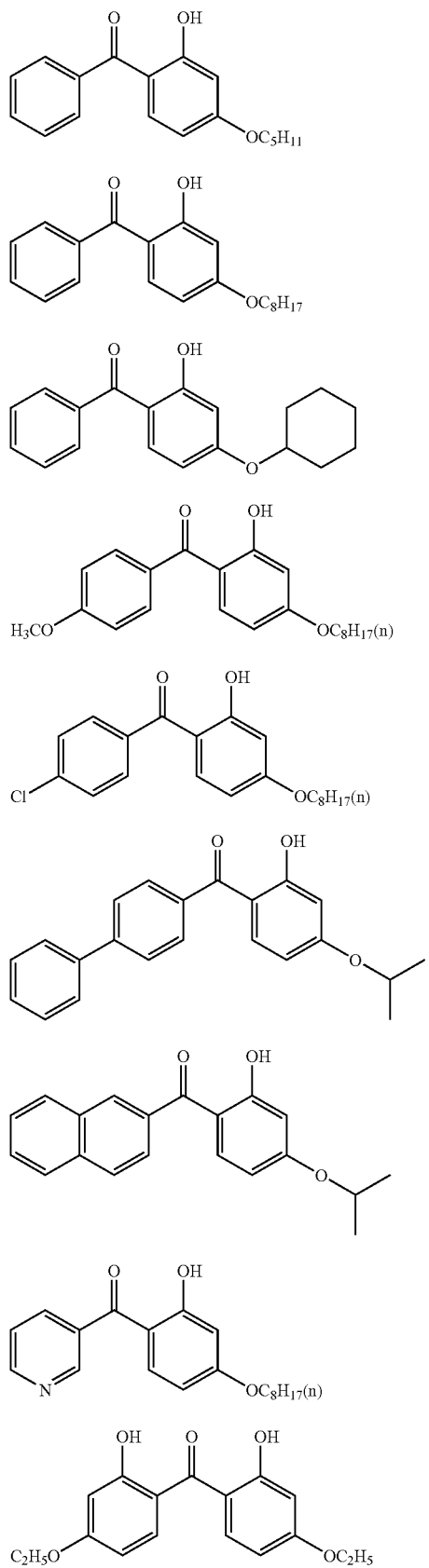
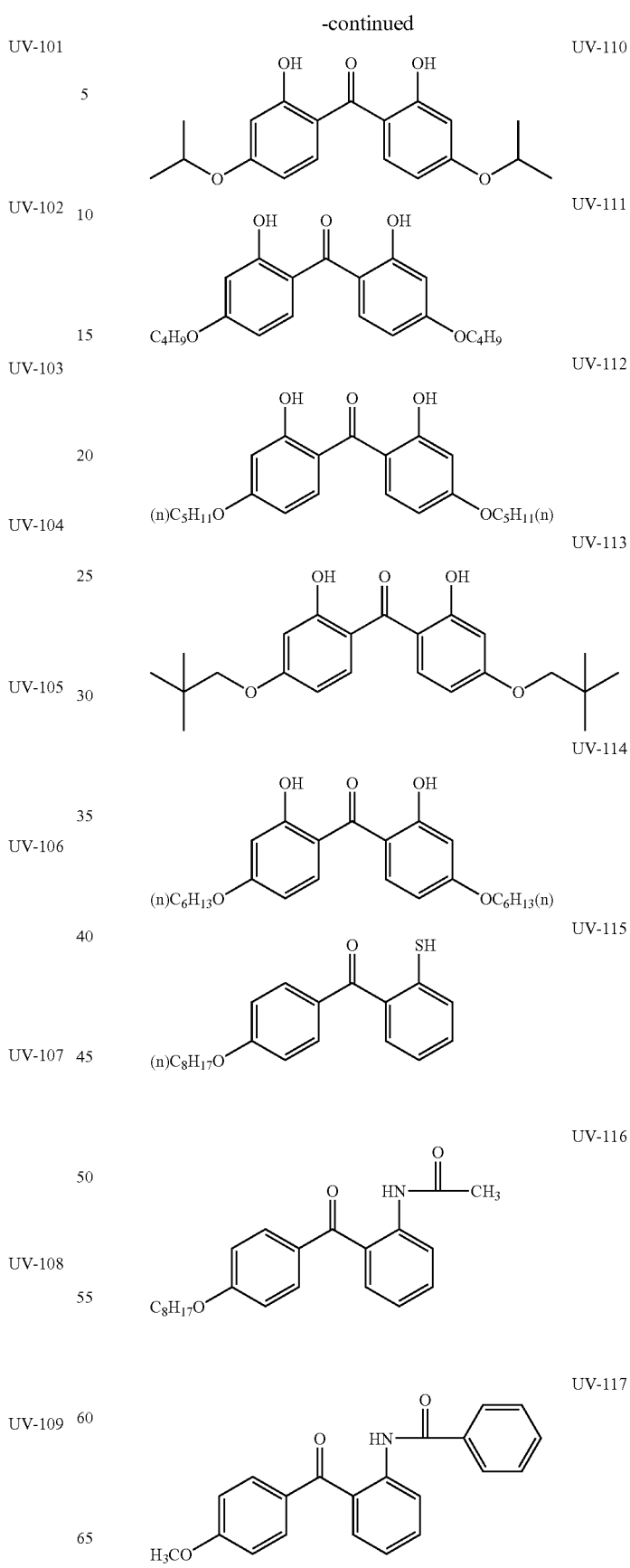

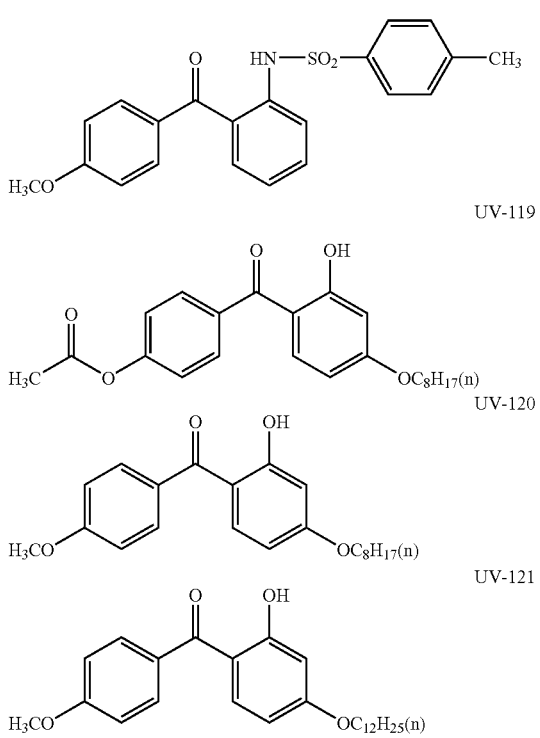

One of other preferable examples of the wavelength dispersion adjusting agent is a compound represented by the formula (5) below.

Formula (5)

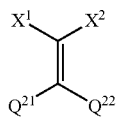

In the formula, $Q^{21}$ and $Q^{22}$ independently represent an aromatic ring. Each of $X^1$ and $X^2$ represents a hydrogen atom or a substituent group, wherein at least either one of which represents a cyano group, carbonyl group, sulfonyl group or aromatic heterocycle.

The aromatic ring represented by $Q^{21}$ and $Q^{22}$ may be an aromatic hydrocarbon ring or an aromatic heterocycle. These may be a monocycle, or may further form a condensed ring with other ring. The aromatic hydrocarbon ring is preferably a monocyclic or bicyclic aromatic hydrocarbon ring having the number of carbon atoms of 6 to 30 (e.g., benzene ring, naphthalene ring), more preferably an aromatic hydrocarbon ring having the number of carbon atoms of 6 to 20, more preferably an aromatic hydrocarbon ring having the number of carbon atoms of 6 to 12, and still more preferably a benzene ring. The aromatic heterocycle is preferably a nitrogen-atom-containing or sulfur-atom-containing aromatic heterocycle. Specific examples of the heterocycle include thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthylidine, quinoxaline, quinazoline, cinnoline, pteridine, acridine, phenanthroline, phenazine, tetrazole, benzimidazole, benzoxazole, benzothiazole, benzotriazole and tetrazaindene. The aromatic heterocycle is preferably pyridine, triazine or quinoline.

Each of $Q^{21}$ and $Q^{22}$ preferably represents an aromatic hydrocarbon ring, and more preferably a benzene ring. Each of $Q^{11}$ and $Q^{12}$ may further have a substituent group, wherein the substituent group is preferably selected from the above-described substituent group T.

Each of $X^1$ and $X^2$ represents a hydrogen atom or a substituent group, wherein at least either one of which represents a cyano group, carbonyl group, sulfonyl group or aromatic heterocycle. The above-described substituent group T is applicable to the substituent group represented by $X^1$ and $X^2$. The substituent group represented by $X^1$ and $X^2$ may further be substituted by other substituent group, or $X^1$ and $X^2$ may be condensed with each other to thereby form a ring structure.

Each of $X^1$ and $X^2$ is preferably a hydrogen atom, alkyl group, aryl group, cyano group, nitro group, carbonyl group, sulfonyl group or aromatic heterocycle, more preferably a cyano group, carbonyl group, sulfonyl group or aromatic heterocycle, still more preferably a cyano group or carbonyl group, and particularly preferably a cyano group or alkoxycarbonyl group (—C(=O)OR, where R is an alkyl group having the number of carbon atoms of 1 to 20, aryl group having the number of carbon atoms of 6 to 12, and combinations thereof).

Among the compounds represented by the formula (5), the compounds represented by a formula (5-A) are preferred.

Formula (5-A)

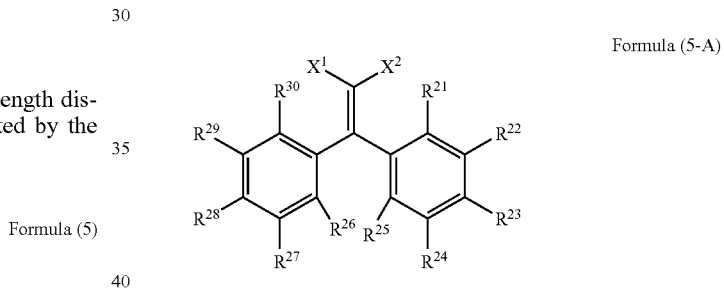

In the formula, $R^{21}$, $R^{22}$, $R^{23}$, $R^{24}$, $R^{25}$, $R^{26}$, $R^{27}$, $R^{28}$, $R^{29}$ and $R^{30}$ respectively represent a hydrogen atom or a substituent group. The substituent is selected from Substituent Group T shown above. The substituent may be substituted with at least one substituent group or form a condensed ring by bonding each other. $X^1$ and $X^2$ are respectively same as those in the formula (5) and the preferred scopes are also same.

It is preferred that $R^{21}$, $R^{22}$, $R^{24}$, $R^{25}$, $R^{26}$, $R^{27}$, $R^{29}$ and $R^{30}$ respectively represent a hydrogen atom, an alkyl group, an alkenyl group, an alkynyl group, an aryl group, a substituted or non-substituted amino group, an alkoxy group, an aryloxy group, a hydroxy group or a halogen atom; it is more preferred that $R^{21}$, $R^{22}$, $R^{24}$, $R^{25}$, $R^{26}$, $R^{27}$, $R^{29}$ and $R^{30}$ respectively represent a hydrogen atom, an alkyl group, an aryl group, an alkoxy group, an aryloxy group or a halogen atom; it is much more preferred that $R^{21}$, $R^{22}$, $R^{24}$, $R^{25}$, $R^{26}$, $R^{27}$, $R^{29}$ and $R^{30}$ respectively represent a hydrogen atom or a $C_{1-12}$ alkyl group; it is further much more preferred that $R^{21}$, $R^{22}$, $R^{24}$, $R^{25}$, $R^{26}$, $R^{27}$, $R^{29}$ and $R^{30}$ respectively represent a hydrogen atom or methyl; and it is most preferred that $R^{21}$, $R^{22}$, $R^{24}$, $R^{25}$, $R^{26}$, $R^{27}$, $R^{29}$ and $R^{30}$ respectively represent a hydrogen atom.

It is preferred that $R^{23}$ and $R^{28}$ respectively represent a hydrogen atom, an alkyl group, an alkenyl group, an alkynyl group, an aryl group, a substituted or non-substituted amino group, an alkoxy group, an aryloxy group, a hydroxy group or a halogen atom; it is more preferred that $R^{23}$ and $R^{28}$ respectively represent a hydrogen atom, a $C_{1-20}$ alkyl group, a $C_{0-20}$ amino group, a $C_{1-20}$ alkoxy group, a $C_{6-12}$ aryloxy group or a hydroxy group; it is much more preferred that $R^{23}$ and $R^{28}$ respectively represent a hydrogen atom, a $C_{1-12}$ alkyl group or a $C_{1-12}$ alkoxy group; and it is most preferred that $R^{23}$ and $R^{28}$ respectively represent a hydrogen atom.

Among the compounds represented by the formula (5-A), the compounds having a cyano group represented by a formula (5-B) are more preferred.

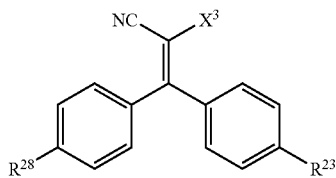

Formula (5-B)

In the formula, $R^{23}$ and $R^{28}$ are respectively same as those in the formula (5-A), and the preferred scopes are also same. $X^3$ represents a hydrogen atom or a substituent group. The substituent is selected from Substituent Group T shown above. The substituent may be substituted with at least one substituent group or form a condensed ring by bonding each other.

It is preferred that $X^3$ represents a hydrogen atom, an alkyl group, an aryl group, a cyano group, a nitro group, a carbonyl group, a sulfonyl group or an aryl heteroring; it is more preferred that $X^3$ represents a cyano group, a carbonyl group, a sulfonyl group or an aryl heteroring; it is much more preferred that $X^3$ represents a cyano group or a carbonyl group; and it is further much more preferred that $X^3$ represents a cyano group or an alkoxycarbonyl group, or in other words —C(═O)OR where R represents a $C_{1-20}$ alkyl group, a $C_{6-12}$ aryl group or a combination thereof.

Among the compounds represented by the formula (5-B), the compounds represented by a formula (5-C) are more preferred.

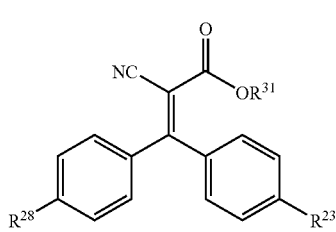

Formula (5-C)

In the formula, $R^{23}$ and $R^{28}$ are respectively same as those in the formula (5-A), and the preferred scopes are also same. $R^{23}$ represents a $C_{1-20}$ alkyl group.

When both of $R^{23}$ and $R^{28}$ are hydrogen atoms, $R^{31}$ preferably represents a $C_{2-12}$ alkyl group, more preferably represents a $C_{4-12}$ alkyl group, much more preferably represents a $C_{6-12}$ alkyl group, further much more preferably n-octyl, tert-octyl, 2-ethylhexyl, n-decyl or n-dodecyl, and most preferably represents 2-ethylhexyl.

When neither $R^{23}$ nor $R^{28}$ are hydrogen atoms, $R^{31}$ is preferably selected from alkyl groups having 20 or more carbon atoms such that the molecular weight of the compound represented by the formula (5-C) is not less than 300.

The compounds represented by the formula (5) can be synthesized by a method described in Journal of American Chemical Society, Vol. 63, p. 3452, (1941).

Specific examples of the compounds represented by the formula (5) will be listed below, wherein the present invention is by no means limited to the specific examples listed below.

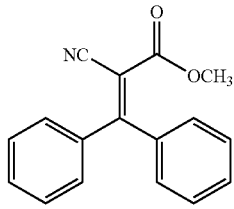

UV-201

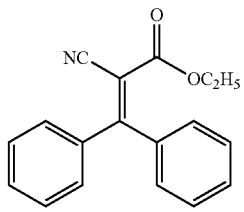

UV-202

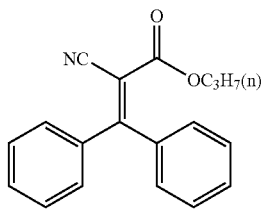

UV-203

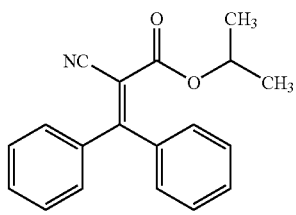

UV-204

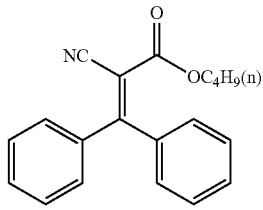

UV-205

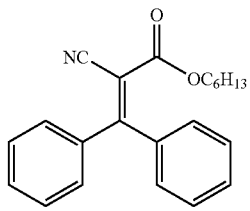

UV-206

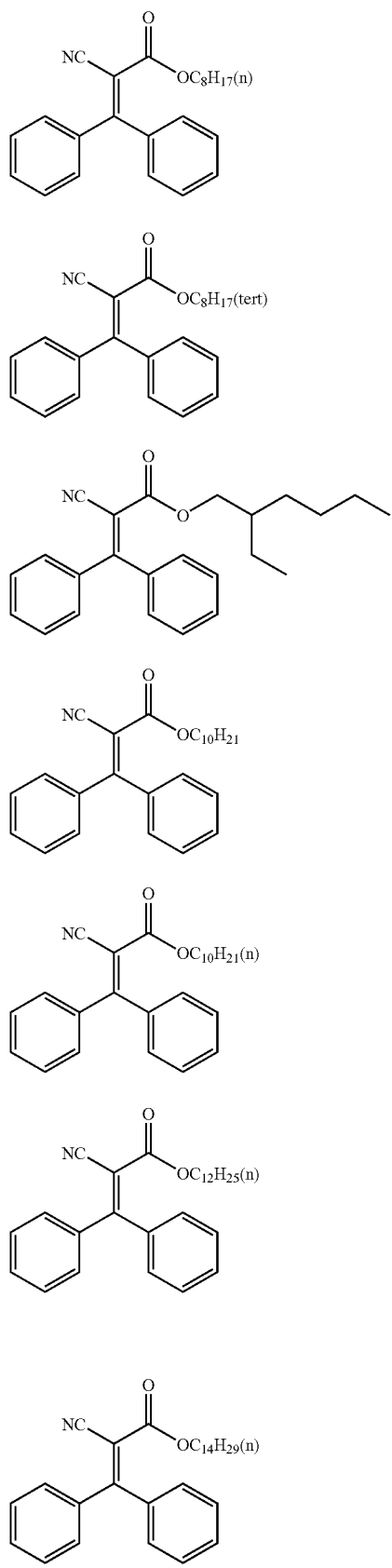
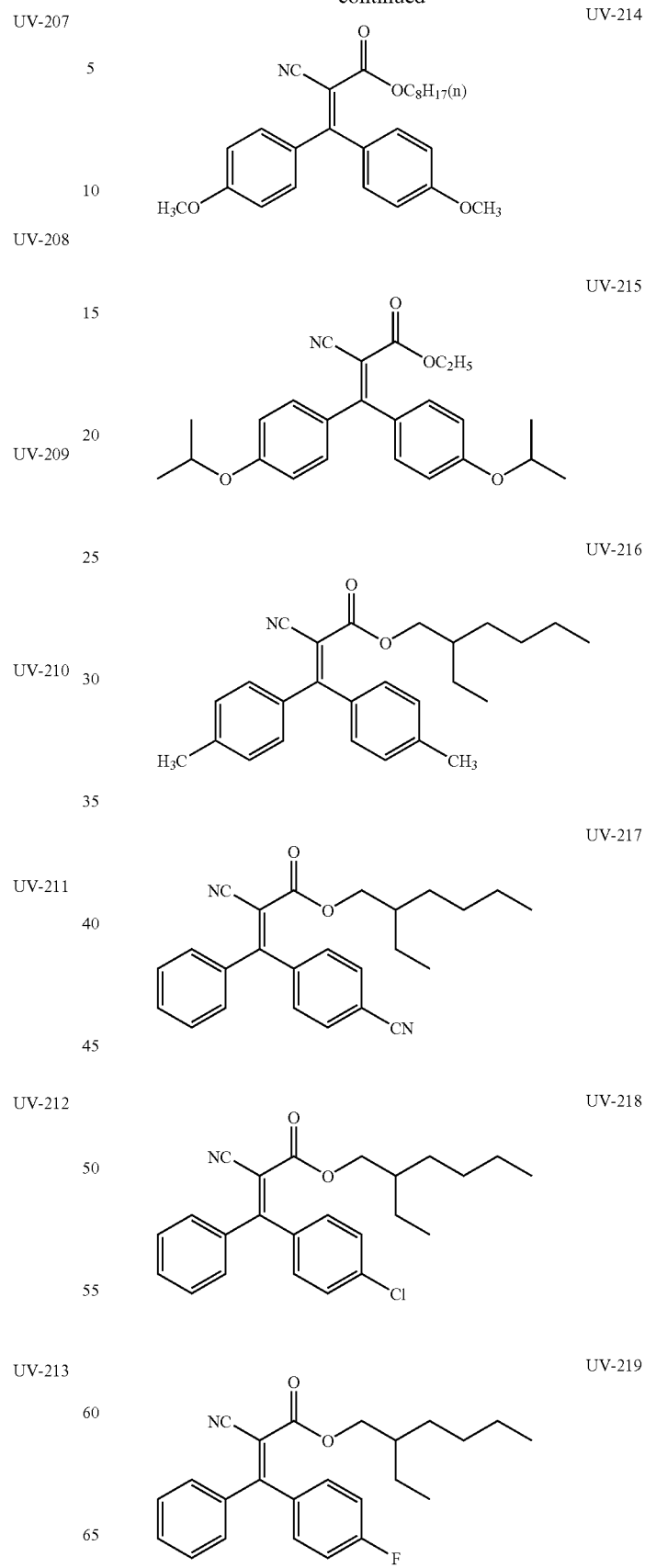

-continued

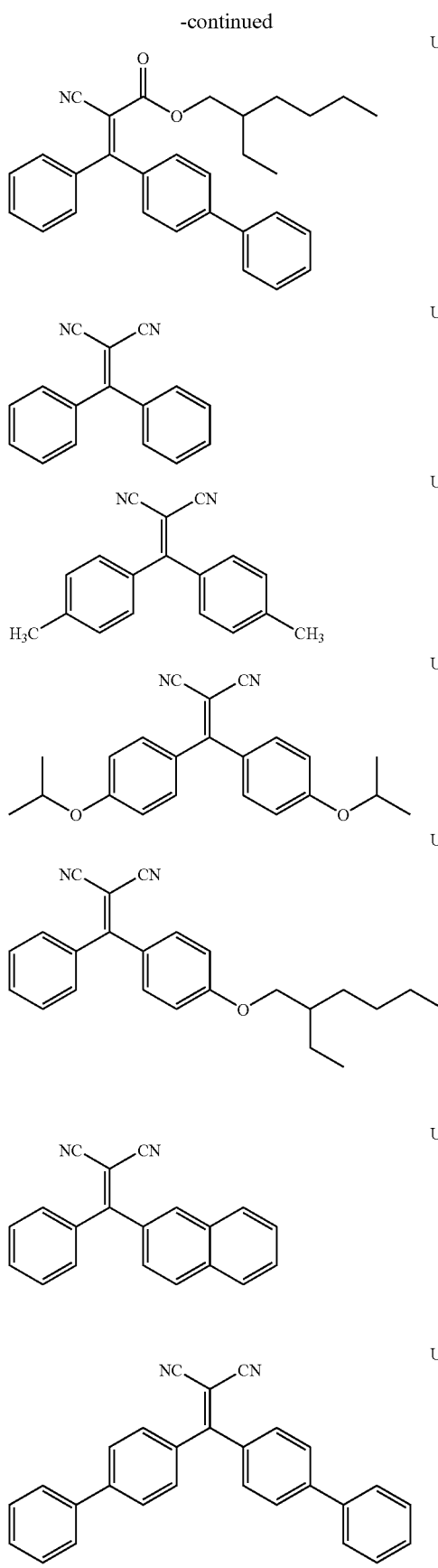

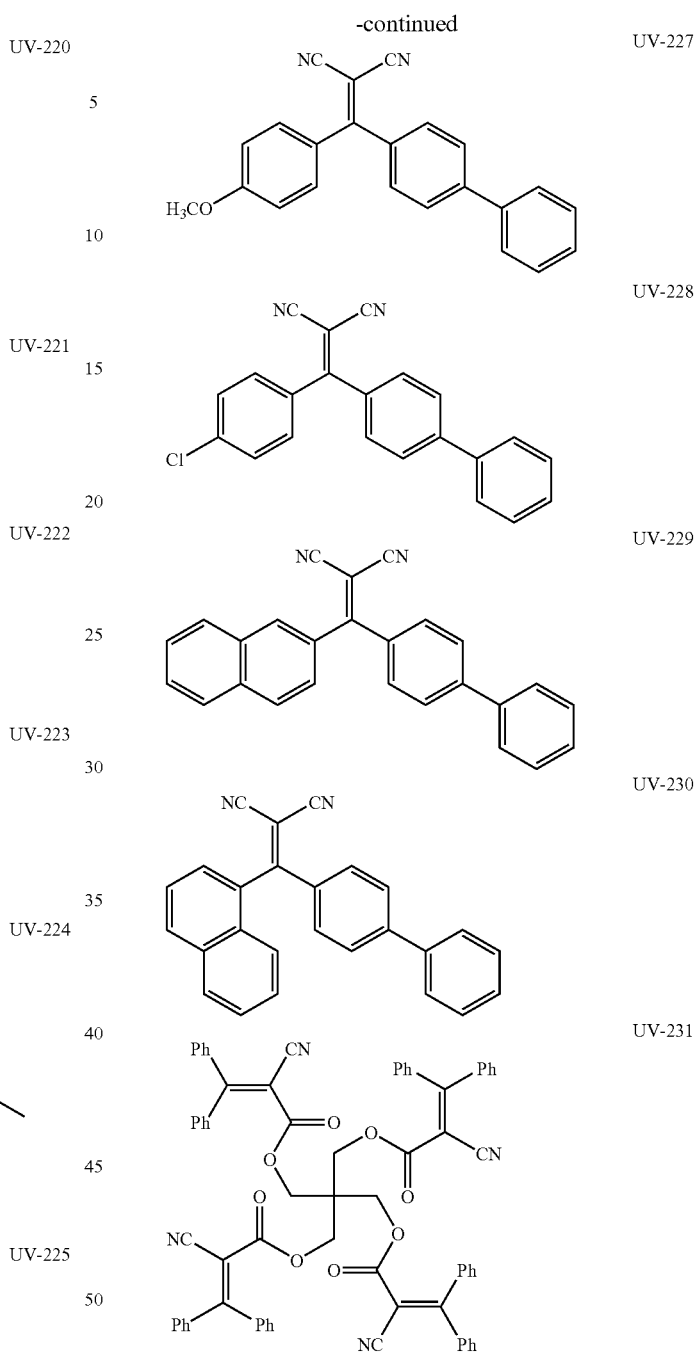

<<Preparation of Cellulose Acylate Film>>

The cellulose acylate film is preferably prepared by the solvent cast process. In the solvent cast process, a film is produced using a solution (dope) obtained by dissolving cellulose acylate in an organic solvent. The organic solvent preferably contains a solvent selected from ether having the number of carbon atoms of 3 to 12, ketone having the number of carbon atoms of 3 to 12, ester having the number of carbon atoms of 3 to 12, and halogenated hydrocarbon having the number of carbon atoms of 1 to 6. The ether, ketone and ester may have a cyclic structure. Any compounds having two or more functional groups of ether, ketone and ester (i.e., —O—, —CO— and —COO—) are also available as the organic solvent. The organic solvent may have other functional group such as alcoholic hydroxyl group. The organic solvent having two or more functional groups is acceptable if the number of carbon atoms thereof falls within range specified for a compound having any of these functional groups.

Examples of the ether having the number of carbon atoms of 3 to 12 include diisopropyl ether, dimethoxy methane, dimethoxy ethane, 1,4-dioxane, 1,3-dioxolane, tetrahydrofuran, anisole and phenetole. Examples of the ketone having the number of carbon atoms of 3 to 12 include acetone, methyl ethyl ketone, diethyl ketone, diisobutyl ketone, cyclohexanone and methyl cyclohexanone. Examples of the ester having the number of carbon atoms of 3 to 12 include ethyl formate, propyl formate, pentyl formate, methyl acetate, ethyl acetate and pentyl acetate. Examples of the organic solvent having two or more functional groups include 2-ethoxyethyl acetate, 2-methoxy ethanol and 2-butoxy ethanol. The number of carbon atoms of the halogenated hydrocarbon is preferably 1 or 2, and most preferably 1. Halogen in the halogenated hydrocarbon is preferably chlorine. Ratio of substitution of hydrogen atoms with halogen in the halogenated hydrocarbon is preferably 25 to 75 mol %, more preferably 30 to 70 mol %, still more preferably 35 to 65 mol %, and most preferably 40 to 60 mol %. Methylene chloride is a representative halogenated hydrocarbon. It is also allowable to mix two or more species of the organic solvents.

A cellulose acylate solution can be prepared by a general method. The general method means a treatment at a temperature of 0° C. or above (normal temperature or high temperature). The solvent can be prepared using a method and an apparatus of preparing a dope in the general solvent cast process. In the general method, it is prefearble to use halogenated hydrocarbon (in particular, methylene chloride) as the organic solvent.

Amount of cellulose acylate is adjusted so that it is contained in an amount of 10 to 40 weight % in the obtained solution. It is further preferable to adjust the amount of cellulose acylate to 10 to 30 weight %. The organic solvent (main solvent) may preliminarily added with any arbitrary additives described later. The solution can be prepared by stirring cellulose acylate and the organic solvent at normal temperature (0 to 40° C.). The solvent of a higher concentration may stirred under pressurized and heated conditions. More specifically, cellulose acylate and the organic solvent are placed in a pressure vessel, tightly closed, and stirred under pressure while heating the mixture at a temperature not lower than the boiling point of the solvent at normal pressure, but so as not to allow the solvent to boil. The heating temperature is generally 40° C. or above, more preferably 60 to 200° C., and still more preferably 80 to 110° C.

The individual components may otherwise be placed in the vessel after being preliminarily and roughly mixed, or may serially be placed into the vessel. The vessel must be configured so as to allow stirring. The vessel can be pressurized by injecting an inert gas such as nitrogen gas. It is also allowable to make use of rise in the vapor pressure of the solvent under heating. It is still also allowable to tightly close the vessel, and then to add the individual components under pressure. The heating is preferably effected outside of the vessel. It is allowable to use a jacket-type heating device. It is also allowable to dispose a plate heater outside the vessel, and to heat the entire portion of the vessel by allowing a fluid to flow through a piping provided thereto. It is preferable to provide a stirring propeller inside the vessel, and to use it for the stirring. The stirring propeller preferably has a length which is long enough to reach the wall of the vessel. It is preferable to attach a scraping blade at the end of the stirring propeller, for the convenience of refreshing the liquid film on the vessel wall. It is also allowable to equip the vessel with measuring instruments such as a pressure gauge, a thermometer, and so forth. The individual components are dissolved into the solvent within the vessel. The prepared dope is taken out from the vessel after cooled, or first taken out and then cooled using a heat exchanger or the like.

It is also allowable to prepare the solution by the cooled solubilization process. The cooled solubilization process makes it possible to solubilize cellulose acylate into an organic solvent which is hard to solubilize it with the aid of the general solubilization process. The cooled solubilization process is also advantageous in rapidly obtaining a homogeneous solution even if a solvent is capable of dissolving cellulose acylate with the aid of the general solubilization process. In the cooled solubilization process, first cellulose acylate is gradually added into the organic solvent under stirring at room temperature. Amount of cellulose acylate is preferably adjusted so that the resultant mixture will contain it in an amount of 10 to 40 weight %. The amount of cellulose acylate is more preferably 10 to 30 weight %. The mixture may preliminarily be added with any arbitrary additives described later.

Next, the mixture is cooled to −100 to −10° C. (more preferably −80 to −10° C., still more preferably −50 to −20° C., and most preferably −50 to −30° C.). The cooling can be effected typically in a diethyleneglycol solution (−30 to −20° C.) cooled on a dry ice/methanol bath (−75° C.). The cooling allows the mixture of cellulose acylate and organic solvent to solidify.

Rate of cooling is preferably 4° C./minute or above, more preferably 8° C./minute or above, and most preferably 12° C./minute or above. The faster the better, wherein a theoretical upper limit of the rate of cooling is 10,000° C./second, a technical upper limit thereof is 1,000° C./second, and a practical upper limit is 100° C./second. It is to be understood herein that the rate of cooling refers to a value obtained by dividing a difference between a start temperature before the cooling and a final temperature after the cooling, with a time required from the start of cooling to the end of cooling where the final cooling temperature is attained.

Next, heating of the mixture to 0 to 200° C. (more preferably 0 to 150° C., still more preferably 0 to 120° C., and most preferably 0 to 50° C.) allows cellulose acylate to dissolve into the organic solvent. The temperature rise may be attained simply by allowing the mixture to stand in room temperature, or by heating on a hot bath.

Rate of heating is preferably 4° C./minute or above, more preferably 8° C./minute or above, and most preferably 12° C./minute or above. The faster the better, wherein a theoretical upper limit of the rate of heating is 10,000° C./second, a technical upper limit thereof is 1,000° C./second, and a practical upper limit is 100° C./second. It is to be understood herein that the rate of heating refers to a value obtained by dividing a difference between a start temperature before the heating and a final temperature after the heating, with a time required from the start of heating to the end of heating where the final heating temperature is attained.

The homogeneous solution can thus be obtained. Any insufficient solubilization may resolved by repetitive cooling and heating. Whether the solubilization is sufficient or not can be judged simply by visual observation of an appearance of the solution.

In the cooled solubilization process, it is preferable to use an air-tight vessel in order to prevent water from entering, which is possibly caused by dewing during the cooling. In the cooling and heating operations, pressurization during the cooling and reduction in the pressure during the heating are successful in reducing the solubilization time. Use of a pressure vessel is preferable in view of carrying out the pressurization and pressure reduction.

Differential scanning calorimetry (DSC) of a 20 weight % solution of cellulose acylate (degree of acetylation: 60.9%, viscosity mean degree of polymerization: 299) dissolved into methyl acetate reveals that the solution shows a pseudo phase transition point between the sol state and gel state at around 33° C., wherein the solution can exist in a gel form below this temperature. It is therefore necessary to store the solution at a temperature not lower than the pseudo phase transition temperature, and more preferably at a temperature higher by 10° C. or around than the pseudo phase transition temperature. It is to be noted herein that the pseudo phase transition temperature will differ by degree of acetylation and viscosity mean degree of polymerization of cellulose acylate, concentration of the solution, and organic solvent used herein.

The cellulose acylate film is produced using thus-prepared cellulose acylate solution (dope) by the solvent cast process.

The dope is cast and spread on a drum or a band, and the solvent is allowed to vaporize so as to form a film. Concentration of the dope before the casting is preferably adjusted so as to have a solid content of 18 to 35%. The surface of the drum or band is preferably mirror-finished. Methods of the casting and drying for the solvent cast process are described in the individual patent specifications of U.S. Pat. Nos. 2,336,310, 2,367,603, 2,492,078, 2,492,977, 2,492,978, 2,607,704, 2,739,069, 2,739,070, British Patent No. 640731 and ditto No. 736892, and in the individual published patent specifications of Japanese Examined Patent Publication "Tokkosho" No. 45-4554 and ditto No. 49-5614, Japanese Laid-Open Patent Publication "Tokkaisho" No. 60-176834, ditto No. 60-203430 and ditto No. 62-115035.

The dope is preferably cast and spread on the drum or band conditioned to have a surface temperature of 10° C. or below. It is preferable to dry the cast dope under an air blow for 2 seconds or longer. It is also allowable to separate the obtained film from the drum or band, and to vaporize the residual solvent by blowing a hot air at temperatures sequentially varied from 100 to 160° C. This method is described in Examined Japanese Patent Publication "Tokkohei" No. 5-17844. This method makes it possible to shorten the time required from the casting to the separation. In order to make effect of this method, it is necessary for the dope to gellate at the surface temperature of the drum or band during the casting and spreading.

The cellulose acylate film may be added with a plasticizer in order to improve the mechanical characteristics or rate of drying. Phosphoric acid ester or carboxilic acid ester is used as the plasticizer. Examples of the phosphoric acid ester include triphenyl phosphate (TPP) and tricresyl phosphate (TCP). As the carboxilic acid ester, phthalic ester and citric acid ester are representative. Examples of the phthalic acid ester include dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of the citric acid ester include triethyl O-acetyl citrate (OACTE) and tributyl O-acetyl citrate (OACTB). Other examples of the carboxilic acid ester include butyl oleate, methylacetyl ricinoleate, dibutyl sebacate, and various trimellitic acid esters. Preferably used are phthalic acid ester-base plasticizers (DMP, DEP, DBP, DOP, DPP, DEHP). DEP and DPP are particularly preferable.

Amount of addition of the plasticizer is preferably adjusted to 0.1 to 25 weight % of amount of cellulose ester, more preferably 1 to 20 weight %, and most preferably 3 to 15 weight %.

The cellulose acylate film may be added with an anti-degradation agent (e.g., antioxidant, peroxide decomposing agent, radical inhibitor, metal inactivator, acid capture agent, amine). The anti-degradation agent is described in Japanese Laid-Open Patent Publication "Tokkaihei" No. 3-199201, ditto. ditto No. 5-1907073, ditto No. 5-194789, and ditto No. 5-271471, ditto No. 6-107854. Amount of addition of the anti-degradation agent is preferably adjusted to 0.01 to 1 weight % of the prepared solution (dope), and more preferably 0.01 to 0.2 weight %, in view of allowing the effect of addition to exhibit, and of suppressing the bleeding-out of the anti-degradation agent coming up to the film surface. Particularly preferable examples of the anti-degradation agent include butylated hydroxytoluene (BHT) and tribenzylamine (TBA).

<<Stretching of Cellulose Acylate Film>>

Retardation of the cellulose acylate film can be adjusted by stretching. Magnitude of stretching is preferably 3 to 100%.

There is no special limitation on the method of stretching, and any publicly-known methods are applicable. Tenter stretching is particularly preferable in view of in-plane uniformity. The cellulose acylate film used in the present invention preferably has a width of at least 100 cm, and a variation in the Re value over the width of ±5 nm, and more preferably ±3 nm. Variation in the Rth value is preferably ±10 nm, and more preferably ±5 nm. Also variations in the Re value and Rth value in the longitudinal direction preferably fall within the ranges same as those for the width-wise variations.

The stretching may be carried out during the film formation process, or the wound-up film after the formation may be stretched. In the former case, the film may be stretched as containing a certain amount of residual solvent, wherein the film is preferably stretched under an amount of residual solvent of 2 to 30%. In this case, it is preferable to transfer the film in the longitudinal direction thereof and to concomitantly stretch it in the direction normal to the longitudinal direction, to thereby align the slow axis of the film in the direction normal to the longitudinal direction thereof.

Stretching temperature can appropriately be selected depending on the amount of residual solvent during the stretching and the thickness. The film stretched as containing the residual solvent is preferably dried after the stretching. Methods of drying may be similar to those adopted in the fabrication of the film described in the above.

Thickness of the stretched cellulose acylate film is preferably 110 μm or less, more preferably 40 to 110 μm, still more preferably 60 to 110 μm, and most preferably 80 to 110 μm.

<<Surface Treatment of Cellulose Acylate Film>>

For the case where an optical compensation film composed of the cellulose acylate film is used as a transparent protective film of the polarizing plate, the cellulose acylate film is preferably surface-treated. The surface treatment may be corona discharge treatment, glow discharge treatment, flame treatment, acid treatment, alkali treatment or ultraviolet irradiation treatment. It is particularly preferable to carry out the acid treatment or alkali treatment, which is a saponification treatment for cellulose acylate.

The above-described cellulose acylate film, stretched as containing the rod-like compound having at least two aromatic rings and a linear structure, satisfying the desired retardation values Re, Rth, and Re/Rth, and having a thickness of 40 μm to 110 μm, can satisfy the optical characteristics necessary for the optical compensation film of the present invention, and can be used as the optical compensation film for various types of liquid crystal displays.

Figure 7:
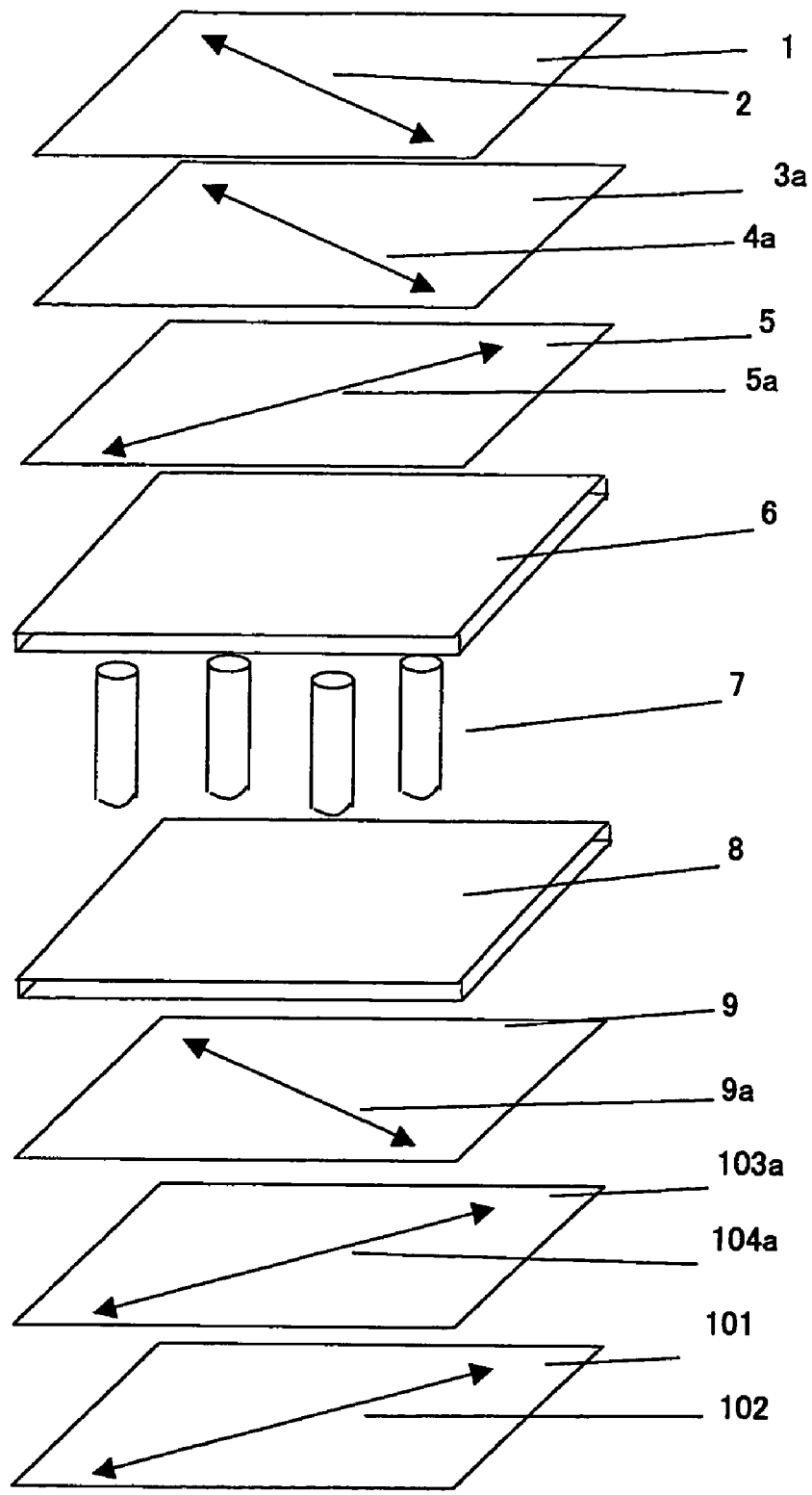
FIG. 7 is a schematic drawing showing an exemplary liquid crystal display of the present invention.

Next paragraphs will describe an embodiment of the present invention applied to a VA-MODE liquid crystal display, referring to FIG. 7.

[Liquid Crystal Display]

A liquid crystal display shown in FIG. 7 comprises an upper polarizing film 1 and a lower polarizing film 101 disposed so as to hold a liquid crystal cell (6 to 8) in between, wherein an optical compensation film 5 of the present invention is disposed between the upper polarizing film 1 and the liquid crystal cell (6 to 8), and an optical compensation film 9 of the present invention is disposed between the lower polarizing film 101 and liquid crystal cell (6 to 8). As described in the above, either the optical compensation film 5 or the optical compensation film 9 may be absent for some embodiments. Each of the polarizing films 1 and 101 is respectively protected by a pair of transparent protective films, where FIG. 1 shows only the transparent protective films 3a and 103a placed on the side closer to the liquid crystal cell, and those placed on the side distant from the liquid crystal cell are not illustrated. It is also possible to make a single film have both functions of the optical compensation film 5 and transparent protective film 3a. Similarly, it is also possible to make a single film have both functions of the optical compensation film 9 and transparent protective film 103a.

The liquid crystal cell comprises an upper substrate 6, a lower substrate 8, and a liquid crystal layer formed of liquid crystal molecules 7 held therebetween. Each of the surfaces of the substrates 6 and 8 in contact with the liquid crystal molecules 7 (occasionally referred to as "inner surface", hereinafter) have an orientation film (not shown) formed thereon, so as to vertically align the liquid crystal molecules 7 in no-applied-voltage or low-applied-voltage state. On each of the inner surfaces of the substrates 6 and 8, there is formed a transparent electrode (not shown) capable of applying voltage to a liquid crystal layer composed of the liquid crystal molecules 7. In this invention, product $\Delta n \cdot d$ of thickness of the liquid crystal layer d (μm) and refractive index anisotropy $\Delta n$ is preferably adjusted to 0.1 to 1.0 μm, wherein an optimum value thereof is more preferably adjusted to 0.2 to 1.0 μm, and still more 0.2 to 0.5 μm. These ranges, ensuring a high luminance in the white display and a low luminance in the black display, successfully provide a bright, high-contrast display device. There is no special limitation on species of the liquid crystal material, wherein it is necessary to use liquid crystal materials having a negative dielectric anisotropy such as allowing the liquid crystal molecules to respond vertically to the direction of electric field when voltage is applied between the upper and lower substrates 6 and 8. On the other hand, liquid crystal materials having a positive dielectric anisotropy can be used for the case where the electrode is formed on only either one of the substrates 6 and 8, and so that the electric field is longitudinally formed in parallel with the substrate surface.

For an exemplary case where the liquid crystal cell is configured-as a VA-mode liquid crystal cell, a nematic liquid crystal material having a negative dielectric anisotropy, $\Delta n=0.0813$ and $\Delta \epsilon=-4.6$ or around can be used between the upper and lower substrates 6 and 8. There is no specific limitation on the thickness d of the liquid crystal layer, wherein it can be adjusted to 3.5 μm or around for the case where the liquid crystal material having characteristics within the above-described ranges is used. Since brightness in the white display mode varies depending on the product $\Delta n \cdot d$ of the thickness d and refractive index anisotropy $\Delta n$, it is preferable to adjust $\Delta n \cdot d$ so as to fall within a range from 0.2 to 0.5 μm, in view of obtaining a maximum brightness.

A chiral agent, which is generally used in the TN-mode liquid crystal display, may sometimes be added herein for the purpose of reducing the orientation failure, although it is not so usual to use it in the VA-mode liquid crystal display, due to fear of degradation in the dynamic response characteristics. For the case where the multi-domain structure is configured, the chiral agent is even advantageous for the purpose of adjusting the orientation of the liquid crystal molecules in the boundary region between the individual domains. The multi-domain structure herein refers to a structure in which one pixel of the liquid crystal display is divided into a plurality of domains. For example, the VA mode in the white display mode results in differences in the luminance and color tone when viewed from the oblique direction and from the direction opposite thereto, because the liquid crystal molecules 7 are obliquely aligned and therefore show different degrees of birefringence, whereas the multi-domain structure is successful in improving the viewing angle dependence of the luminance and color tone. More specifically, it is possible to reduce the viewing-angle-dependent biases in the luminance and color tone by configuring, and thereby averaging, each pixel with two or more (preferably 4 or 8) domains differing in the initial orientation state. A similar effect can be obtained also by configuring each pixel with two or more domains in which the direction of orientation of the liquid crystal molecules continuously changes under voltage application.

A plurality of domains, differed in the direction of orientation of the liquid crystal molecules 7, can be formed within a single pixel by a method of, for example, deviating the direction of electric field or biasing the electric field density through provision of slits or projections to the electrodes. Increase in the number of division is supposed to be advantageous in obtaining an omnidirectionally uniform viewing angle, wherein the number of division of 4 or 8 or more will be successful enough to obtain an almost uniform viewing angle. In particular, 8-division is preferable because the absorption axis of the polarizing plate can be set to an arbitrary angle. There is a general tendency that the liquid crystal molecules 7 are less likely to respond at the boundary region of the domains. This raises a problem of lowering in the luminance in the normally-black mode such as VA mode, because the black display is maintained. Addition of a chiral agent to the liquid crystal material makes it possible to reduce the boundary regions. On the other hand, the contrast in the front view tends to lower in the normally-white mode, because the white display is maintained. It is preferable for this case to provide a light intercepting layer such as a black matrix covering the regions.

It is preferable that the slow axes 4a and 104a of the protective films 3a and 103a formed on the polarizing films 1 and 101, respectively, on the sides closer to the liquid crystal layer are substantially in parallel or orthogonal to each other. The orthogonal alignment of the slow axes 4a and 104a of the transparent protective films 3a and 103a is successful in preventing the optical characteristics of the incident light normal to the liquid crystal display from lowering, because the birefringence of the individual protective films are canceled. On the other hand, the parallel alignment of the slow axes 4a and 104a can successfully compensate a residual retardation, if any, of the liquid crystal layer with the aid of the birefringence of the protective films.

Directions of the absorption axes 2 and 102 of the polarizing films 1 and 101, the slow axes 4a and 104a of the protective films 3a and 103a, and orientation of the liquid crystal molecules 7 are adjusted within optimum ranges depending on materials used for the individual components, display mode, stacked structure of the components and so forth. More specifically, the polarizing films 1 and 101 are arranged so that the absorption axes 2 and 102 thereof cross substantially normal to each other. The liquid crystal display of the present invention is, however, by no means limited to this configuration.

The optical compensation films 5 and 9 disposed between each of the polarizing film 1 and polarizing film 101, and the liquid crystal cell are the optical compensation film according to the present invention, and typically comprises, as described in the above, a birefringent polymer film, a stack of a transparent substrate and an optically anisotropic layer, composed of a liquid crystal molecules, formed on the transparent substrate, or the like. The in-plane slow axis 5a of the optical compensation film 5 herein is preferably arranged so as to cross substantially normal to the absorption axis 2 of the polarizing film 1 placed more closer thereto. Similarly, the in-plane slow axis 9a of the optical compensation film 9 herein is preferably arranged so as to cross substantially normal to the absorption axis 102 of the polarizing film 101 placed more closer thereto. This arrangement makes the optical compensation film 5 or 9 cause retardation to the incident light from the direction of the normal line so as to prevent the light leakage, and also makes it possible to fully exhibit the effects of the present invention with respect to the incident light from the oblique direction.

For the case where both of the Re value and Rth value of the protective film 3 of the polarizing plate are not 0 nm, the protective film can also exhibit optical compensation property. In this case, the protective film can supplement any shortage in Re and Rth of the optical compensation film separately provided.

In an non-operational state in which the individual transparent electrodes (not shown) on the liquid crystal cell substrates 6 and 8 are applied with no operation voltage, the liquid crystal molecules 7 in the liquid crystal layer align vertically to the surfaces of the substrate 6 and 8, so that the polarization state of the transmitted light will hardly be modified. Because the absorption axes 2 and 102 cross normal to each other, the light incident from the lower side (through the back electrode, for example) is polarized by the polarizing film 101, passes through the liquid crystal cell 6-8 while keeping the polarized state, and is blocked by the polarizing film 1. In other words, the liquid crystal display shown in FIG. 1 realizes an ideal black display in the non-operational state. In contrast, in the operational state in which the transparent electrodes (not shown) are applied with the operation voltage, the liquid crystal molecules 7 incline towards the direction in parallel with the surfaces of the substrates 6 and 8, so that the light passing therethrough will be modified in the polarization state by thus-inclined liquid crystal molecules 7. Therefore, the light incident from the lower side (through the back electrode, for example) is polarized by the polarizing film 101, passes through the liquid crystal cell 6-8 while being further modified in the polarized state, and passes through the polarizing film 1. In other words, the white display is obtained in the operational state under voltage application.

The VA mode is characterized by its high contrast. The conventional VA-mode liquid crystal display, however, suffered from a problem in that the contrast degraded in the oblique view although the contrast in the front view was large. Because the liquid crystal molecules 7 in the black state align vertically to the surfaces of the substrates 6 and 8, the front view, almost not causative of birefringence of the liquid crystal molecules 7, can give a low transmittance and a high contrast. The oblique view, however, causes birefringence of the liquid crystal molecules 7. Moreover, the cross angle of the absorption axes 2 and 102 of the upper and lower polarizing films 1 and 101 is 90° or orthogonal in the front view, but is larger than 90° in the oblique view. Two these factors have been causative of the conventional problems in the light leakage and lowered contrast in the oblique direction. In contrast, the liquid crystal display of the present invention, configured as shown in FIG. 7, is successful in reducing the light leakage and improving the contrast in the oblique view in the black state, by using the optical compensation films 5 and 9 of the present invention, having different values of Re/Rth respectively for R, G and B lights, and satisfy the specific conditions.

The liquid crystal display is by no means limited to that configured as shown in FIG. 7, and may include other components. For example, it is allowable to dispose a color filter between the liquid crystal cell and the polarizing film. The display device used as of transmission-type may have, as being disposed on the back side thereof, a back light using a cold-cathode or hot-cathode fluorescent tube, light emitting diode, field emission element, or electroluminescence element as the light source thereof.

The liquid crystal display of the present invention include those of direct image vision type, image projection type, and optical modulation type. The present invention is particularly effective when embodied as being applied to an active-matrix liquid crystal display using a three-terminal or a two-terminal semiconductor element such as TFT and MIM. Of course, the present invention is also effective when embodied as being applied to a passive-matrix liquid crystal display represented by STN-type display driven by time-division operations.

Next paragraphs will describe materials used for other various components applicable to the liquid crystal display of the present invention, methods of producing the components, and so forth.

[Polarizing Plate]

According to the present invention, a polarizing plate, comprising a polarizing film and a pair of protective films sandwiching the polarizing film, may be employed. For example, a polarizing plate prepared by staining and stretching a polymer film such as a polyvinyl alcohol film to form a polarizing film and stacking two protective films on the both surfaces of the polarizing film. A polarizing plate is disposed at the outside of a liquid-crystal cell. It is preferred that tow polarizing plates, comprising a polarizing film and a pair of protective films sandwiching the polarizing film, are disposed sandwiching liquid-crystal cell.

<<Protective Film>>

Examples of the polymer which can be used in the protective film include, however not to be limited to, cellulose esters such as cellulose acetate, cellulose acetate butyrate or cellulose acetate propionate; polycarbonates, polyolefins, polystyrenes and polyesters. As described above, the cellulose acylate film, which satisfies the optical properties required for the optical compensatory film of the present invention, may be used as a protective film.

Protective films may be fed in a rolled form and bonded with a long polarizing film continuously such that their long axes are aligned with each other. The orientation axis (slow axis) of the protective film is desirably, however, not to be limited to, set to be parallel to the long axis from the viewpoint of workability.

The protective film may be selected from the polymers having a slow axis in a direction that an in-plane mean refractive index is maximum. At least one of the pair of the protective films may be selected from the polymers of which main mean refractive indices nx, ny and nz satisfy ny=nz, nx>ny or nx=ny, nz, nx>nz. In the formulae, nx, ny and nz are respectively main mean refractive indices in the directions of x-axis, y-axis and z-axis orthogonal to each other, nx and ny are in-plane main mean refractive indices in parallel with the surface of the film, and nz is a depth main mean refractive index. As described above, for the embodiments in which the protective film functions as an optical compensation film, it is preferred that the Re/Rth(450 nm) value of the protective film is 0.4 to 0.95 times as large as Re/Rth(550 nm) at 550 nm, the Re/Rth(650 nm) value of the protective film is 1.05 to 1.9 times as large as Re/Rth(550 nm), and the Rth value at 550 nm of the film is 70 nm to 400 nm.

On the other hand, for the embodiments in which the protective film doesn't function as an optical compensation film, it is preferred that the retardation of the protective is small. Especially, for the embodiments in which the absorption axis of the polarizing film is not parallel to the orientation axis of the protective film, it is not preferred that the retardation of the protective film is higher than a certain value, since linearly polarized light may be changed into elliptically polarized light due to oblique misalignment between the polarizing axis and the orientation axis (slow axis) of the protective film. Accordingly, the retardation at 632.8 nm of the protective film is desirably not greater than 10 nm, and more desirably not greater than 5 nm. Preferred examples of the polymer film having a low retardation include cellulose triacetate films and polyolefin polymers such as "ZEONEX" or "ZEONOR" (both manufactured by ZEON CORPORATION) or "ARTON" (manufactured by JSR Corporation). Non-birefringent optical polymer materials, described in JPA No. hei 8-110402 or No. hei 11-293116, are also included in the examples. When the optical compensation film comprising an optically anisotropic layer formed of liquid-crystal molecules and a substrate supporting the layer is employed in the present invention, the substrate may function as a protective film of the polarizing film.

When a polarizing film is bonded to two protective films, they may be stacked such that the slow axis (orientation axis) of at least one protective film (a protective film disposed at a side closer to a liquid-crystal cell) is not parallel to the polarizing axis (stretching axis) of the polarizing film. More specifically, the angle between the absorption axis of the polarizing film and the slow axis of the protective film is desirably set within the range from 10° to 90°, more desirably from 20° to 70°, much more desirably from 40° to 50° and further much more desirably from 43° to 47°. The angle between the absorption axis of the polarizing film and the slow axis of another protective film may be set within a range depending on the application, and desirably set within, however, not to be limited to, the above range. It is preferred that the slow axes of the pair of the protective films are aligned with each other.

When the slow axis of the protective film and the absorption axis of the polarizing film are parallel to each other, it is possible to prevent the polarizing plate from changing in dimension or curling up, and, thus, to improve mechanical stabilities of the polarizing plate. Such effects may be obtained if at least two axes of three films, or in other words a polarizing film and a pair of protective films, are stacked such as a slow axis of one protective film and an absorption axis of the polarizing film or slow axes of the two protective films, are substantially parallel to each other.

<<Adhesive Agent>>

Adhesive agents may be used for bonding polarizing films and protective films. Examples of the adhesive agent include PVA resins such as modified PVA resins with acetoacetyl groups, sulfonic acid groups, carboxyl groups or oxyalkylene groups; and boric compound solutions. PVA resins are preferred. The thickness of the adhesion layer between the polarizing film and the protective film is desirably set within the range from 0.01 to 10 μm and more desirably from 0.05 to 5 μm.

<<Integrated Production Process for Polarizing film and Transparent Protective Film>>

The polarizing plate applicable to the present invention is produced by stretching a polarizing film-forming film and by succeedingly drying the product so as to allow it to shrink and to have a lowered volatile content, wherein it is preferable to bond a transparent protective film at least on one surface thereof after or during the drying, and to subject the stack to post-heating. For an embodiment in which the transparent protective film also serves as a support of the optically anisotropic layer which functions as the optical compensation film, it is preferable to bond the transparent support, having the transparent protective film on one surface thereof and having the optically anisotropic layer on the opposite surface thereof, to the polarizing film-forming film, and to subject the stack to the post-heating. Specific examples of the bonding method include a method in which the transparent protective film is bonded to the polarizing film using an adhesive, while the polarizing film is dried as being held at the both ends thereof, and then the both ends are slit off; and a method in which the polarizing film-forming film is dried, released from the holder for both ends, slit at both ends off, and bonded with the transparent protective film. Methods of slitting may be general techniques such as cutting using a cutter such as cutting edges, laser, and so forth. The bonding is preferably followed by heating in order to dry the adhesive and to improve the polarization performances. Conditions for the heating may vary depending on the adhesive, wherein a water-base adhesive is preferably dried at 30° C. or above, more preferably 40° C. to 100° C., and still more preferably 50° C. to 90° C. It is further preferable to carry out these processes in an integrated production line, in view of performances and production efficiency.

<<Performances of Polarizing Plate>>

Optical characteristics and durability (short-term and long-term storability) of the transparent protective film, polarizer, and polarizing plate composed of a transparent support relevant to the present invention are preferably equivalent or superior to those of a commercial super-high-contrast product (e.g., HLC2-5618, a product of Sanritz Corporation). More specifically, the polarizing plate preferably has a visible light transmittance of 42.5% or above, a degree of polarization of $\{(Tp-Tc)/(Tp+Tc)\}^{1/2} \geq 0.9995$ (where, Tp is parallel transmittance, and Tc is orthogonal transmittance), a rate of change in the light transmittance before and after being allowed to stand in an atmosphere of 60° C. and relative humidity of 90% for 500 hours, and then allowed to stand in a dry atmosphere of 80° C. for 500 hours of 3% or less on the absolute value basis, more preferably 1% or less, and a rate of change in the degree of polarization of 1% or less on the absolute value basis, more preferably 0.1% or less.

EXAMPLES

The present invention will further be detailed referring to specific Examples. Materials, reagents, amount of use and ratio thereof, manipulation and so forth may appropriately be modified without departing from the spirit of the present invention. It is to be understood that the scope of the present invention is by no means limited to the specific examples described below.

A liquid crystal display configured similarly to as shown in FIG. 7, in which an optical compensation film 5 is absent, can be produced as follows.

That is, an upper polarizing plate (protective film (not shown), polarizing film 1, protective film 3a), liquid crystal cell (upper substrate 6, liquid crystal layer 7, lower substrate 8), optical compensation film 9 (also serves as the protective film 103a), and lower polarizing plate (polarizing film 101, protective film (not shown)) are stacked in this order as viewed from the direction of viewing (top), and a back light source (not shown) is further disposed. Next paragraphs will describe methods of producing the individual members to be used herein.

<Production of Liquid Crystal Cell>

The liquid crystal cell is produced by drop-wisely injecting a liquid crystal material ("MLC6608", product of MERCK), having a negative dielectric anisotropy, between the substrates spaced so as to ensure a 3.6-μm cell gap therebetween, to thereby form the liquid crystal layer between the substrates. Retardation of the liquid crystal layer (i.e., product Δn·d of the thickness d (μm) and refractive index anisotropy Δn) is adjusted to 300 nm. The liquid crystal material is vertically aligned by preliminarily coating an orientation film ("JALS-2021-R1", product of JSR) on the substrate. A VA-mode liquid crystal cell is thus produced.

<Production of Upper and Lower Polarizing Plates>

(Production of Polarizing Film)

A rolled polyvinyl alcohol film of 80 μm thick is continuously stretched 5 times as long as the original in an aqueous iodine solution, and dried to thereby obtain the polarizing film. Polyvinyl alcohol used herein is PVA-117H, product of Kuraray Co., Ltd.

<Production of Optical Compensation Film>

The individual ingredients of a cellulose acetate solution, of which formulation shown below, are placed in a mixing tank, and stirred under heating, to thereby prepare the cellulose acetate solution.

| (Composition of Cellulose Acetate Solution) | |
| --- | --- |
| Cellulose acetate having a degree of acetylation of 60.9% | 83 weight parts |
| Cellulose acetate having a degree of acetylation of 55.0% | 17 weight parts |
| Triphenyl phosphate (plasticizer) | 7.8 weight parts |
| Biphenyl diphenyl phosphate (plasticizer) | 3.9 weight parts |
| Methylene chloride (first solvent) | 318 weight parts |
| Methanol (second solvent) | 47 weight parts |

In another mixing tank, 16 weight parts of a retardation enhancer explained below, 0.1 to 32 weight parts of the above-described wavelength dispersion adjusting agent UV-102, 87 weight parts of methylene chloride and 13 weight parts of methanol are placed, and stirred under heating, to thereby prepare a retardation control agent solution.

Then 474 weight parts of the cellulose acetate solution is mixed with 36 weight parts of the above-described retardation control agent (enhancer) solution, and thoroughly mixed to thereby prepare a dope. Amount of addition of the retardation enhancer agent is 5.0 weight parts per 100 weight parts of cellulose acetate.

Retardation Enhancer

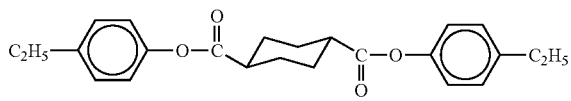

The obtained dope is subjected to flow using a band flow-casting machine. A film having a residual solvent content of 15 weight % is longitudinally stretched using a tenter at 130° C. by a magnitude of stretching of 3 to 100%, to thereby produce a cellulose acetate film (80 μm thick). Thus-produced cellulose acetate film (optical compensation film) is subjected to measurement of the Re retardation value and Rth retardation value, using an ellipsometer (M-150, product of JASCO Corporation).

An Re value of 0 to 50 nm, and an Rth value of 70 to 400 nm may be successfully obtained, by stretching the optical compensation film by a magnitude of stretching of 3 to 100%, and by adding 0.1 to 10 weight % of the above-described wavelength dispersion adjusting agent UV-102 so as to adjust the Re value and Rth value within the desired ranges. Thus-obtained optical compensation film is incorporated into the liquid crystal display element as shown in FIG. 1. The optical compensation film is placed on the back-light side, wherein it is to be noted that the position of the optical compensation film may be on the viewer side or may be on the back-light side, because exchange of the positions of the back light and viewer gives completely the same result. For a protective film 3a of an upper polarizing plate, used is Zeonor film (product of ZEON Corporation) having an extremely small retardation, showing Rth and Re of substantially 0 nm.

<Measurement of Leakage Light and Chromaticity of Produced Liquid Crystal Display>

A liquid-crystal display produced according to the process described above or the like may give a small value of transmittance in the black state in an oblique direction, and give only a small color shifting from the front view.

Example 1

An optical simulation was carried out with respect to a liquid-crystal display model, having a same configuration as shown in FIG. 7, to confirm the effect of the present invention. For optical calculations, "LCD Master Ver6.08" provided by Shintech, INC. was used. A liquid crystal cell, electrodes, substrates polarizing plates or the like employed in known liquid crystal displays can be applied to the model. The postulated model had a liquid crystal cell, employing a vertical alignment with 90° pre-tilt angle, in which the cell gap was determined such that retardation of the liquid crystal cell (i.e., product Δn·d of the thickness d (μm) and refractive index anisotropy Δn) was 300 nm. As the values relating to a polarizing film, the values of "G1220DU", which were input preliminarily into a simulator, were used. The retardation, Re and Rth, values at 450 nm, 550 nm and 650 nm of the optical compensation film, were set as shown in the columns for Liquid crystal display No. 1 in Table 1 shown below. As the values relating to a backlight, the values which were input preliminarily into the simulator were used. Thus, a postulated liquid-crystal model, having a same configuration as shown in FIG. 7, was determined.

<Light Leakage and Color Shifting of the Postulated Liquid-crystal Model>

On the presumption that the model was applied a voltage giving a minimum transmittance, or in other words black voltage, the transmittance (%) in the direction at a viewing angle with an azimuthal angle 270° and with a polar angle 60° in the black state and the color shifting value were calculated. The results are shown in Table 1.

The retardation, Re and Rth, values at 450 nm, 550 nm and 650 nm of an optical compensation film, were varied as shown in the columns for Liquid crystal displays Nos. 2 to 7 in Table 1, and the transmittances (%) and the color shifting values were calculated in the same manner as the above. The results are shown in Table 1.

TABLE 1

Transmittance (%) in the Black State as Viewed from Direction of Azimuth = 45° and Polar Angle = 60°

| Liquid crystal display No. | Wavelength 450 nm | | | Wavelength 550 nm | | | Wavelength 650 nm | | | $Re_{450}/Rth_{450}$ $Re_{550}/Rth_{550}$ | $Re_{650}/Rth_{650}$ $Re_{550}/Rth_{550}$ | Trans- mittance (%) | Color shifting from the front view $\Delta xy$ |
|---|---|---|---|---|---|---|---|---|---|---|---|---|---|
| | $Re_{450}$ (nm) | $Rth_{450}$ (nm) | $Re_{450}/Rth_{450}$ | $Re_{550}$ (nm) | $Rth_{550}$ (nm) | $Re_{550}/Rth_{550}$ | $Re_{650}$ (nm) | $Rth_{650}$ (nm) | $Re_{650}/Rth_{650}$ | | | | |
| 1 | 57 | 275 | 0.21 | 57 | 275 | 0.21 | 57 | 275 | 0.21 | 1.0 | 1.0 | 0.025 | 0.11 |
| 2 | 52 | 281 | 0.19 | 57 | 275 | 0.21 | 64 | 274 | 0.23 | 0.89 | 1.13 | 0.02 | 0.08 |
| 3 | 46 | 287 | 0.16 | 57 | 275 | 0.21 | 71 | 271 | 0.26 | 0.77 | 1.26 | 0.016 | 0.04 |
| 4 | 40 | 293 | 0.14 | 57 | 275 | 0.21 | 78 | 270 | 0.29 | 0.66 | 1.39 | 0.012 | 0.035 |
| 5 | 35 | 287 | 0.12 | 57 | 275 | 0.21 | 85 | 268 | 0.32 | 0.59 | 1.53 | 0.017 | 0.05 |
| 6 | 30 | 281 | 0.11 | 57 | 275 | 0.21 | 92 | 267 | 0.34 | 0.52 | 1.66 | 0.021 | 0.075 |

It is known from the results shown in Table 1, that the liquid crystal displays No. 2 to No. 6 according to the embodiment of the present invention, having Re/Rth(450 nm) 0.5 to 0.9 times as large as Re/Rth(550 nm) and having Re/Rth(650 nm) 1.1 to 1.6 times as large as Re/Rth(550 nm), show smaller values of transmittance in the black state at a polar angle of 60°, and show only a small color shifting from the front view, as compared with the liquid crystal display model No. 1 as a comparative example. It is also understood from the results shown in Table 1, that the transmittance and color shifting from the front view are minimized when Re/Rth(450 nm) is 0.58 times as large as Re/Rth(550 nm), and Re/Rth(650 nm) is 1.5 times as large as Re/Rth(550 nm).

Example 2

Using a liquid crystal display model having a similar configuration to as shown in FIG. 7, or in other words comprising an upper polarizing plate (protective film (not shown), polarizing film 1), an optical compensation film 5 (also serves as the protective film 3a), a liquid crystal cell (upper substrate 6, a liquid crystal layer 7, a lower substrate 8), an optical compensation film 9 (also serves as the protective film 103a) and a lower polarizing plate (polarizing film 101, protective film (not shown)) stacked in this order as viewed from the direction of viewing (top), and a back light source (not shown), the simulation was carried out in the same manner as Example 1. The retardation, Re and Rth, values at 450 nm, 550 nm and 650 nm of the optical compensation film, were varied as shown in the columns for Liquid crystal display Nos. 7 to 12 in Table 2 shown below. Other conditions were set as same as the above. And, thus, the transmittances (%) and the color shifting values were calculated in the same manner as the above.

It is known from the results shown in Table 2, that the liquid crystal display models No. 8 to No. 12 according to the embodiment of the present invention, having Re/Rth(450 nm) 0.4 to 0.95 times as large as Re/Rth(550 nm) and having Re/Rth(650 nm) 1.1 to 1.9 times as large as Re/Rth(550 nm), show smaller values of transmittance in the black state at a polar angle of 60, and show only a small color shifting from the front view, as compared with the liquid crystal display model No. 7 as a comparative example. It is also understood from the results shown in Table 2, that the transmittance and color shifting from the front view are minimized when Re/Rth (450 nm) is 0.66 times as large as Re/Rth(550 nm), and Re/Rth(650 nm) is 1.39 times as large as Re/Rth(550 nm).

Example 3

Using a liquid crystal display having a similar configuration to as shown in FIG. 7 except that an optical compensation film 5 is absent, or in other words comprising an upper polarizing plate (protective film (not shown), a polarizing film 1, a protective film 3a), a liquid crystal cell (upper substrate 6, liquid crystal layer 7, a lower substrate 8), an optical compensation film 9 (also serves as the protective film 103a) and a lower polarizing plate (polarizing film 101, protective film (not shown)) stacked in this order as viewed from the direction of viewing (top), and a back light source (not shown), the simulation was carried out in the same manner as Example 1. The retardation, Re and Rth, values at 450 nm, 550 nm and 650 nm of an optical compensation film, were varied as shown in the columns for Liquid crystal display Nos. 13 to 18 in Table 3 shown below. Other conditions were set as same as the above. And, thus, the transmittances (%) and the color shifting values were calculated in the same manner as the above.

TABLE 2

Transmittance (%) in the Black State as Viewed from Direction of Azimuth = 45° and Polar Angle = 60°

| Liquid crystal display No. | Wavelength 450 nm | | | Wavelength 550 nm | | | Wavelength 650 nm | | | $Re_{450}/Rth_{450}$ $Re_{550}/Rth_{550}$ | $Re_{650}/Rth_{650}$ $Re_{550}/Rth_{550}$ | Trans- mittance (%) | Color shifting from the front view $\Delta xy$ |
|---|---|---|---|---|---|---|---|---|---|---|---|---|---|
| | $Re_{450}$ (nm) | $Rth_{450}$ (nm) | $Re_{450}/Rth_{450}$ | $Re_{550}$ (nm) | $Rth_{550}$ (nm) | $Re_{550}/Rth_{550}$ | $Re_{650}$ (nm) | $Rth_{650}$ (nm) | $Re_{650}/Rth_{650}$ | | | | |
| 7 | 52 | 128 | 0.41 | 52 | 128 | 0.41 | 52 | 128 | 0.41 | 1.0 | 1.0 | 0.025 | 0.094 |
| 8 | 51 | 131 | 0.39 | 52 | 128 | 0.41 | 58 | 123 | 0.47 | 0.96 | 1.16 | 0.019 | 0.07 |
| 9 | 39 | 135 | 0.29 | 52 | 128 | 0.41 | 64 | 119 | 0.54 | 0.71 | 1.32 | 0.015 | 0.051 |
| 10 | 33 | 140 | 0:24 | 52 | 128 | 0.41 | 70 | 115 | 0.61 | 0.58 | 1.50 | 0.012 | 0.041 |
| 11 | 29 | 144 | 0.20 | 52 | 128 | 0.41 | 76 | 111 | 0.68 | 0.50 | 1.69 | 0.016 | 0.053 |
| 12 | 25 | 148 | 0.17 | 52 | 128 | 0.41 | 84 | 107 | 0.79 | 0.42 | 1.93 | 0.02 | 0.051 |

TABLE 3

Transmittance (%) in the Black State as Viewed from Direction Azimuth = 45° and Polar Angle = 60°

| Liquid crystal display No. | Wavelength 450 nm | | | Wavelength 550 nm | | | Wavelength 650 nm | | | $Re_{450}/Rth_{450}$ $Re_{550}/Rth_{550}$ | $Re_{650}/Rth_{650}$ $Re_{550}/Rth_{550}$ | Trans- mittance (%) | Color shifting from the front view $\Delta xy$ |
|---|---|---|---|---|---|---|---|---|---|---|---|---|---|
| | $Re_{450}$ (nm) | $Rth_{450}$ (nm) | $Re_{450}/Rth_{450}$ | $Re_{550}$ (nm) | $Rth_{550}$ (nm) | $Re_{550}/Rth_{550}$ | $Re_{650}$ (nm) | $Rth_{650}$ (nm) | $Re_{650}/Rth_{650}$ | | | | |
| 13 | 69 | 233 | 0.30 | 69 | 233 | 0.30 | 69 | 233 | 0.30 | 1.0 | 1.0 | 0.024 | 0.13 |
| 14 | 60 | 239 | 0.25 | 69 | 233 | 0.30 | 80 | 241 | 0.33 | 0.85 | 1.12 | 0.021 | 0.09 |
| 15 | 54 | 245 | 0.22 | 69 | 233 | 0.30 | 89 | 247 | 0.36 | 0.74 | 1.22 | 0.017 | 0.05 |
| 16 | 48 | 243 | 0.20 | 69 | 233 | 0.30 | 95 | 228 | 0.42 | 0.67 | 1.41 | 0.012 | 0.036 |
| 17 | 43 | 237 | 0.18 | 69 | 233 | 0.30 | 100 | 222 | 0.45 | 0.61 | 1.52 | 0.018 | 0.06 |
| 18 | 37 | 231 | 0.16 | 69 | 233 | 0.30 | 106 | 216 | 0.49 | 0.54 | 1.66 | 0.022 | 0.08 |

It is known from the results shown in Table 3, that the liquid crystal display models No. 14 to No. 18 according to the embodiment of the present invention, having Re/Rth(450 nm) 0.5 to 0.9 times as large as Re/Rth(550 nm) and having Re/Rth(650 nm) 1.1 to 1.7 times as large as Re/Rth(550 nm), show smaller values of transmittance in the black state at a polar angle of 60°, and show only a small color shifting from the front view, as compared with the liquid crystal display model No. 13 as a comparative example. It is also understood from the results shown in Table 3, that the transmittance and color shifting from the front view are minimized when Re/Rth (450 nm) is 0.67 times as large as Re/Rth(550 nm), and Re/Rth(650 nm) is 1.41 times as large as Re/Rth(550 nm).

Having described our invention as related to the present embodiments, it is our intention that the invention not be limited by any of the details of the description, unless otherwise specified, but rather be construed broadly within its spirit and scope as set out in the accompanying claims.

What is claimed is:

1. An optical compensation film having thickness $d_1$ (nm), and mean refractive indices nx, ny and nz respectively in the directions of x-axis, y-axis and z-axis orthogonal to each other, nx and ny being in-plane main mean refractive indices in parallel with the surface of said optical compensation film, where ny<nx, with nz being a depth main mean refractive index, and having Re/Rth(450 nm), a ratio of Re to Rth measured at 450 nm, 0.6 to 0.8 times as large as Re/Rth(550 nm) at 550 nm, and having Re/Rth(650 nm) at 650 nm 1.05 to 1.9 times as large as Re/Rth(550 nm) at 550 nm, Re being in-plane retardation defined as Re={(nx−ny)xd$_1$}, and Rth being depth retardation defined as Rth=[{(nx+ny)/2−nz}xd$_1$], and wherein Re(550 nm) is from 20 to 110 nm.

2. The optical compensation film of claim 1, having Rth at 550 nm falling within the range from 70 nm to 400 nm.

3. The optical compensation film of claim 1, of which Re/Rth(650 nm) is 1.2 to 1.7 times as large as Re/Rth(550 nm).

4. The optical compensation film of claim 1, of which Re/Rth(450 nm), Re/Rth(550 nm) and Re/Rth(650 nm) respectively fall within the range from 0.1 to 0.8.

5. The optical compensation film of claim 1, formed of a composition comprising at least one cellulose acylate.

6. The optical compensation film of claim 5, wherein the composition comprises at least one rod-like compound having at least two aromatic rings.

7. The optical compensation film of claim 6, wherein the rod-like compound is represented by a formula (1):

$$Ar^1-L^1-Ar^2 \quad \text{Formula (1)}$$

where $Ar^1$ and $Ar^2$ independently represents a substituted or non-substituted aromatic group, and $L^1$ represents a divalent linking group selected from the group consisting of alkylene group, alkenylene group, alkynylene group, —O—, —CO— and any combinations thereof.

8. A liquid crystal display comprising:

a liquid crystal cell comprising:

a pair of substrates having an electrode formed on at least either one of said pair, disposed facing each other; and a liquid crystal layer held between said pair of substrates, comprising a nematic liquid crystal material, liquid crystal molecules of said nematic liquid crystal material being aligned substantially normal to the surfaces of said pair of substrates in the black state, and having a Δn·d of 0.2 to 1.0 μm, said Δn·d being a product of the thickness d (μm) and the refractive index anisotropy Δn;

first and second polarizing films disposed so as to hold said liquid crystal cell in between; and an optical compensation film disposed between at least one of said first and second polarizing films and said liquid crystal cell, wherein said optical compensation film has thickness $d_1$ (nm), and mean refractive indices nx, ny and nz respectively in the directions of x-axis, y-axis and z-axis orthogonal to each other, nx and ny being in-plane main mean refractive indices in parallel with the surface of said optical compensation film, where ny<nx, with nz being a depth main mean refractive index, has Re/Rth (450 nm), a ratio of Re to Rth measured at 450 nm, 0.6 to 0.8 times as large as Re/Rth(550 nm) at 550 nm, and has Re/Rth(650 nm) at 650 nm 1.05 to 1.9 times as large as Re/Rth(550 nm) at 550 nm, Re being in-plane retardation defined as Re={(nx−ny)xd$_1$}, and Rth being depth retardation defined as Rth=[{(nx+ny)/2−nz}xd$_1$], and wherein Re(550 nm) is from 20 to 110 nm, and Rth at 550 nm of said optical compensation film is 70 nm to 400 nm.

9. The liquid crystal display of claim 8, comprising said optical compensation film between said liquid crystal cell and each of said first and second polarizing films.

10. The liquid crystal display of claim 8, wherein the in-plane slow axis of said optical compensation film, and the transmission axis of either one of said first and second polarizing film disposed closer to said optical compensation film are substantially in parallel with each other.

11. The liquid crystal display of claim 8, wherein the optical compensation film has Re/Rth(650 nm) being 1.2 to 1.7 times as large as Re/Rth(550 nm).

12. The liquid crystal display of claim 8, wherein the optical compensation film has Re/Rth(450 nm), Re/Rth(550 nm) and Re/Rth(650 nm) respectively falling within the range from 0.1 to 0.8.

13. The liquid crystal display of claim 8, wherein the optical compensation film is formed of a composition comprising at least one cellulose acylate.

14. The liquid crystal display of claim 13, wherein the composition comprises at least one rod-like compound having at least two aromatic rings.

15. The liquid crystal display of claim 14, wherein the rod-like compound is represented by a formula (1):

   Formula (1)

where $Ar^1$ and $Ar^2$ independently represents a substituted or non-substituted aromatic group, and $L^1$ represents a divalent linking group selected from the group consisting of alkylene group, alkenylene group, alkynylene group, —O—, —CO— and any combinations thereof.

16. An optical compensation film having thickness $d_1$ (nm), and mean refractive indices nx, ny and nz respectively in the directions of x-axis, y-axis and z-axis orthogonal to each other, nx and ny being in-plane main mean refractive indices in parallel with the surface of said optical compensation film, where ny<nx, with nz being a depth main mean refractive index, and having Re/Rth(450 nm), a ratio of Re to Rth measured at 450 nm, 0.4 to 0.95 times as large as Re/Rth(550 nm) at 550 nm, and having Re/Rth(650 nm) at 650 nm 1.2 to 1.7 times as large as Re/Rth(550 nm) at 550 nm, Re being in-plane retardation defined as Re={(nx−ny)xd$_1$}, and Rth being depth retardation defined as Rth=[{(nx+ny)/2−nz}xd$_1$], and wherein Re(550 nm) is from 20 to 110 nm.

17. The optical compensation film of claim 16, having Rth at 550 nm falling within the range from 70 nm to 400 nm.

18. The optical compensation film of claim 16, wherein Re/Rth(450 nm) is 0.6 to 0.8 times as large as Re/Rth (550 nm) at 550 nm.

19. The optical compensation film of claim 16, wherein Re/Rth(450 nm), Re/Rth(550 nm) and Re/Rth(650 nm) respectively fall within the range from 0.1 to 0.8.

20. A liquid crystal display comprising:
a liquid crystal cell comprising:
a pair of substrates having an electrode formed on at least either one of said pair, disposed facing each other; and
a liquid crystal layer held between said pair of substrates, comprising a nematic liquid crystal material, liquid crystal molecules of said nematic liquid crystal material being aligned substantially normal to the surfaces of said pair of substrates in the black state, and having a Δn·d of 0.2 to 1.0 μm, said Δn·d being a product of the thickness d (μm) and the refractive index anisotropy Δn;
first and second polarizing films disposed so as to hold said liquid crystal cell in between; and
an optical compensation film disposed between at least one of said first and second polarizing films and said liquid crystal cell,
wherein said optical compensation film has thickness $d_1$ (nm), and mean refractive indices nx, ny and nz respectively in the directions of x-axis, y-axis and z-axis orthogonal to each other, nx and ny being in-plane main mean refractive indices in parallel with the surface of said optical compensation film, where ny<nx, with nz being a depth main mean refractive index, has Re/Rth (450 nm), a ratio of Re to Rth measured at 450 nm, 0.4 to 0.95 times as large as Re/Rth(550 nm) at 550 nm, and has Re/Rth(650 nm) at 650 nm 1.2 to 1.7 times as large as Re/Rth(550 nm) at 550 nm, Re being in-plane retardation defined as Re={(nx−ny)xd$_1$}, and Rth being depth retardation defined as Rth=[{(nx+ny)/2−nz}xd$_1$], and wherein Re(550 nm) is from 20 to 110 nm, and
Rth at 550 nm of said optical compensation film is 70 nm to 400 nm.

21. The liquid crystal display of claim 20, comprising said optical compensation film between said liquid crystal cell and each of said first and second polarizing films.

22. The liquid crystal display of claim 20, wherein the in-plane slow axis of said optical compensation film, and the transmission axis of either one of said first and second polarizing film disposed closer to said optical compensation film are substantially in parallel with each other.

23. The liquid crystal display of claim 20, wherein the optical compensation film has Re/Rth(450 nm) being 0.6 to 0.8 times as large as Re/Rth(550 nm) at 550 nm.

24. The liquid crystal display of claim 20, wherein the optical compensation film has Re/Rth(450 nm), Re/Rth(550 nm) and Re/Rth(650 nm) respectively falling within the range from 0.1 to 0.8.

* * * * *